US012734819B2

(12) United States Patent
Kyoso

(10) Patent No.: US 12,734,819 B2
(45) Date of Patent: Sep. 15, 2026

(54) LIQUID SUPPLY DEVICE, LIQUID JETTING SYSTEM, PRINTING SYSTEM, AND LIQUID CIRCULATION METHOD

(71) Applicant: FUJIFILM Corporation, Tokyo (JP)

(72) Inventor: Tadashi Kyoso, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 116 days.

(21) Appl. No.: 18/587,845

(22) Filed: Feb. 26, 2024

(65) Prior Publication Data

US 2024/0198692 A1 Jun. 20, 2024

Related U.S. Application Data

(63) Continuation of application No. PCT/JP2022/023587, filed on Jun. 13, 2022.

(30) Foreign Application Priority Data

Aug. 30, 2021 (JP) ................................ 2021-140047

(51) Int. Cl.
*B41J 2/21* (2006.01)
*B41J 2/045* (2006.01)
(Continued)

(52) U.S. Cl.
CPC ......... *B41J 2/2117* (2013.01); *B41J 2/17563* (2013.01); *B41J 2/04581* (2013.01); *C09D 11/322* (2013.01); *C09D 11/54* (2013.01)

(58) Field of Classification Search
CPC .. B41J 2/2117; B41J 2/17563; B41J 2/04581; B41J 2/16517; B41J 2002/1655;
(Continued)

(56) References Cited

U.S. PATENT DOCUMENTS 9,505,221 B2 11/2016 Nakano et al.
9,827,769 B2 11/2017 Kobayashi
(Continued)

FOREIGN PATENT DOCUMENTS

JP 2005288840 10/2005
JP 2006015267 1/2006
(Continued)

OTHER PUBLICATIONS

"International Search Report (Form PCT/ISA/210) of PCT/JP2022/023587", mailed on Aug. 30, 2022, with English translation thereof, pp. 1-5.

(Continued)

*Primary Examiner* — Jason S Uhlenhake
*Assistant Examiner* — Alexander D Shenderov
(74) *Attorney, Agent, or Firm* — JCIPRNET

(57) ABSTRACT

The liquid supply device includes a circulation flow passage that communicates with a circulation port of a liquid jetting head and a supply port of the liquid jetting head and a pressurization device that pressurizes a liquid inside the circulation flow passage, wherein in a case where the liquid is circulated using the circulation flow passage, the pressurization device is controlled to pressurize the liquid, and in a case where a first liquid which has particles dispersed in a solvent and has a particle sedimentation characteristic different from that of a second liquid and where the particles are likely to be sedimented is circulated as the liquid, a pressure that is equal to or more than 2.0 times and equal to or less than 3.5 times a pressure to be applied to the second liquid in a case where the second liquid is circulated is applied to the first liquid.

14 Claims, 14 Drawing Sheets

(51) Int. Cl.
*B41J 2/175* (2006.01)
*C09D 11/322* (2014.01)
*C09D 11/54* (2014.01)

(58) Field of Classification Search
CPC .... B41J 2/16538; B41J 2025/008; B41J 2/01; B41J 2/16535; B41J 2/16588; B41J 2/18; C09D 11/322; C09D 11/54
USPC .......................................................... 347/85
See application file for complete search history.

(56) References Cited

U.S. PATENT DOCUMENTS

| | | | |
|---|---|---|---|
| 10,875,309 B2 | 12/2020 | Arimura et al. | |
| 2004/0061747 A1 | 4/2004 | Nakao et al. | |
| 2009/0091596 A1* | 4/2009 | Askeland | B41J 2/16588 347/22 |
| 2014/0292962 A1* | 10/2014 | Nakano | C09D 11/101 347/85 |
| 2016/0271943 A1 | 9/2016 | Tobita | |
| 2017/0087864 A1 | 3/2017 | Akishiba et al. | |
| 2019/0263137 A1* | 8/2019 | Fukuta | B41J 29/13 |

FOREIGN PATENT DOCUMENTS

| | | |
|---|---|---|
| JP | 2016175264 | 10/2016 |
| JP | 2017065159 | 4/2017 |
| JP | 6303327 | 4/2018 |
| JP | 2019014194 | 1/2019 |
| JP | 2019096198 | 6/2019 |
| JP | 2019155858 | 9/2019 |
| JP | 6582453 | 10/2019 |
| JP | 2020032620 | 3/2020 |

OTHER PUBLICATIONS

"Written Opinion of the International Searching Authority (Form PCT/ISA/237) of PCT/JP2022/023587", mailed on Aug. 30, 2022, with English translation thereof, pp. 1-8.
"Search Report of Europe Counterpart Application", issued on Nov. 29, 2024, p. 1-p. 9.
"Notice of reasons for refusal of Japan Counterpart Application", issued on Mar. 3, 2026, with English translation thereof, pp. 1-9.
"Decision of Refusal of Japan Counterpart Application No. 2023-545101", issued on Jul. 16, 2026, with English translation thereof, p. 1-p. 8.

* cited by examiner 10
100
SYSTEM CONTROL UNIT
120
MEMORY
122
SENSOR
102
PUMP CONTROL UNIT
104
VALVE CONTROL UNIT
106
DEAERATION CONTROL UNIT
108
HEAT EXCHANGE CONTROL UNIT
110
INK DETERMINATION UNIT
112
PRINTING STATE DETERMINATION UNIT
130
PUMP
132
VALVE
22
DEAERATION MODULE
28
HEAT EXCHANGER 200
204
COMPUTER-READABLE MEDIUM
220
PUMP CONTROL PROGRAM
222
VALVE CONTROL PROGRAM
224
DEAERATION CONTROL PROGRAM
226
HEAT EXCHANGE CONTROL PROGRAM
228
INK DETERMINATION PROGRAM
230
PRINTING STATE DETERMINATION PROGRAM
202
PROCESSOR
210
206
COMMUNICATION INTERFACE
208
INPUT/OUTPUT INTERFACE
216
DISPLAY DEVICE
214
INPUT DEVICE

FIG. 5

| PRESSURE DIFFERENCE | WHITE INK JETTING STATE |
|---|---|
| 2500 Pa (1.0 TIMES) | D |
| 3750 Pa (1.5 TIMES) | C |
| 5000 Pa (2.0 TIMES) | B |
| 6250 Pa (2.5 TIMES) | A |
| 7500 Pa (3.0 TIMES) | A |
| 8750 Pa (3.5 TIMES) | A |
| 10000 Pa (4.0 TIMES) | C |

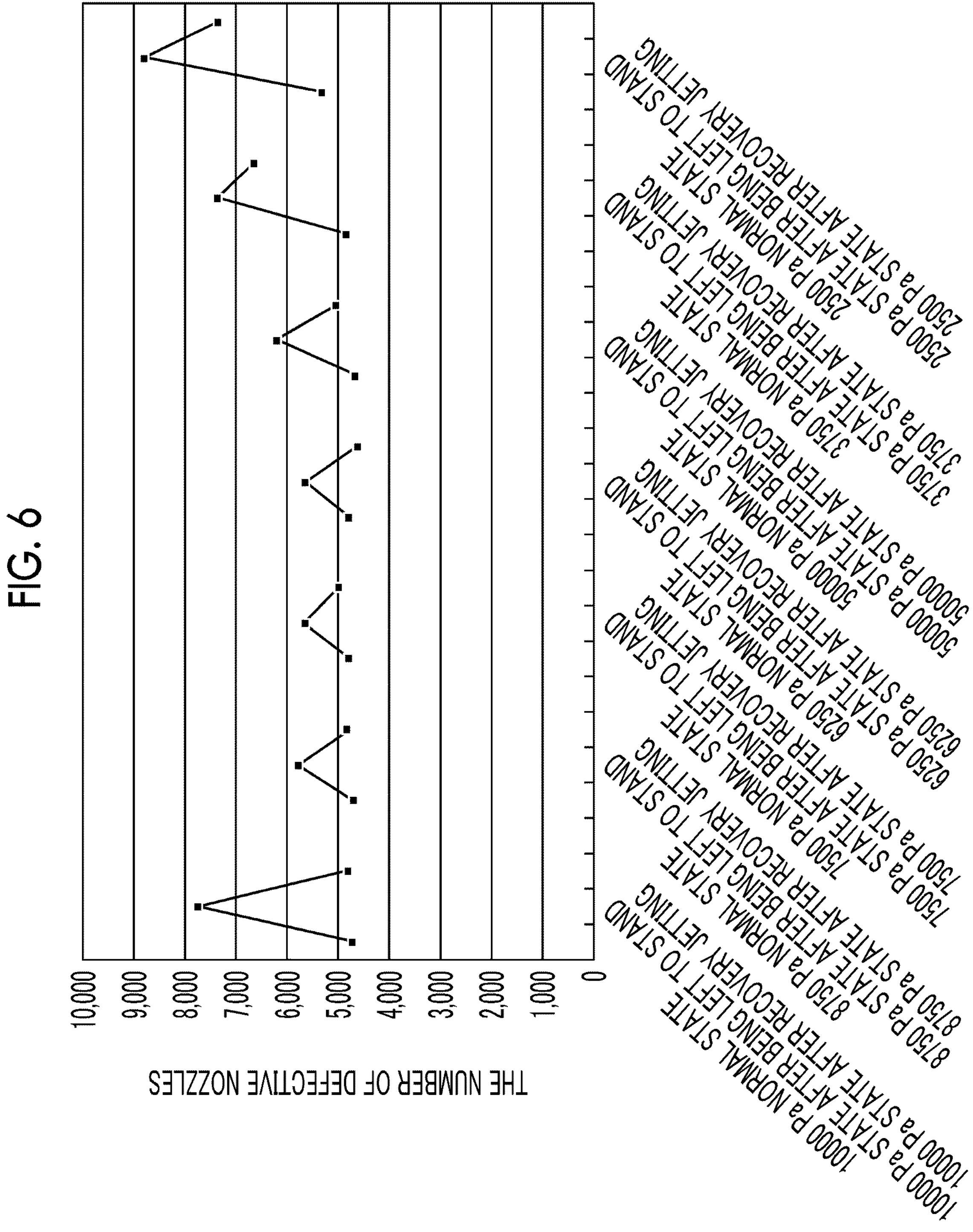
FIG. 6
THE NUMBER OF DEFECTIVE NOZZLES
10,000
9,000
8,000
7,000
6,000
5,000
4,000
3,000
2,000
1,000
0
10000 Pa NORMAL STATE
10000 Pa STATE AFTER BEING LEFT TO STAND
10000 Pa STATE AFTER RECOVERY JETTING
8750 Pa NORMAL STATE
8750 Pa STATE AFTER BEING LEFT TO STAND
8750 Pa STATE AFTER RECOVERY JETTING
7500 Pa NORMAL STATE
7500 Pa STATE AFTER BEING LEFT TO STAND
7500 Pa STATE AFTER RECOVERY JETTING
6250 Pa NORMAL STATE
6250 Pa STATE AFTER BEING LEFT TO STAND
6250 Pa STATE AFTER RECOVERY JETTING
50000 Pa NORMAL STATE
50000 Pa STATE AFTER BEING LEFT TO STAND
50000 Pa STATE AFTER RECOVERY JETTING
3750 Pa NORMAL STATE
3750 Pa STATE AFTER BEING LEFT TO STAND
3750 Pa STATE AFTER RECOVERY JETTING
2500 Pa NORMAL STATE
2500 Pa STATE AFTER BEING LEFT TO STAND
2500 Pa STATE AFTER RECOVERY JETTING 14
14A
IM
262
MOVEMENT DIRECTION OF BLADE
264
260

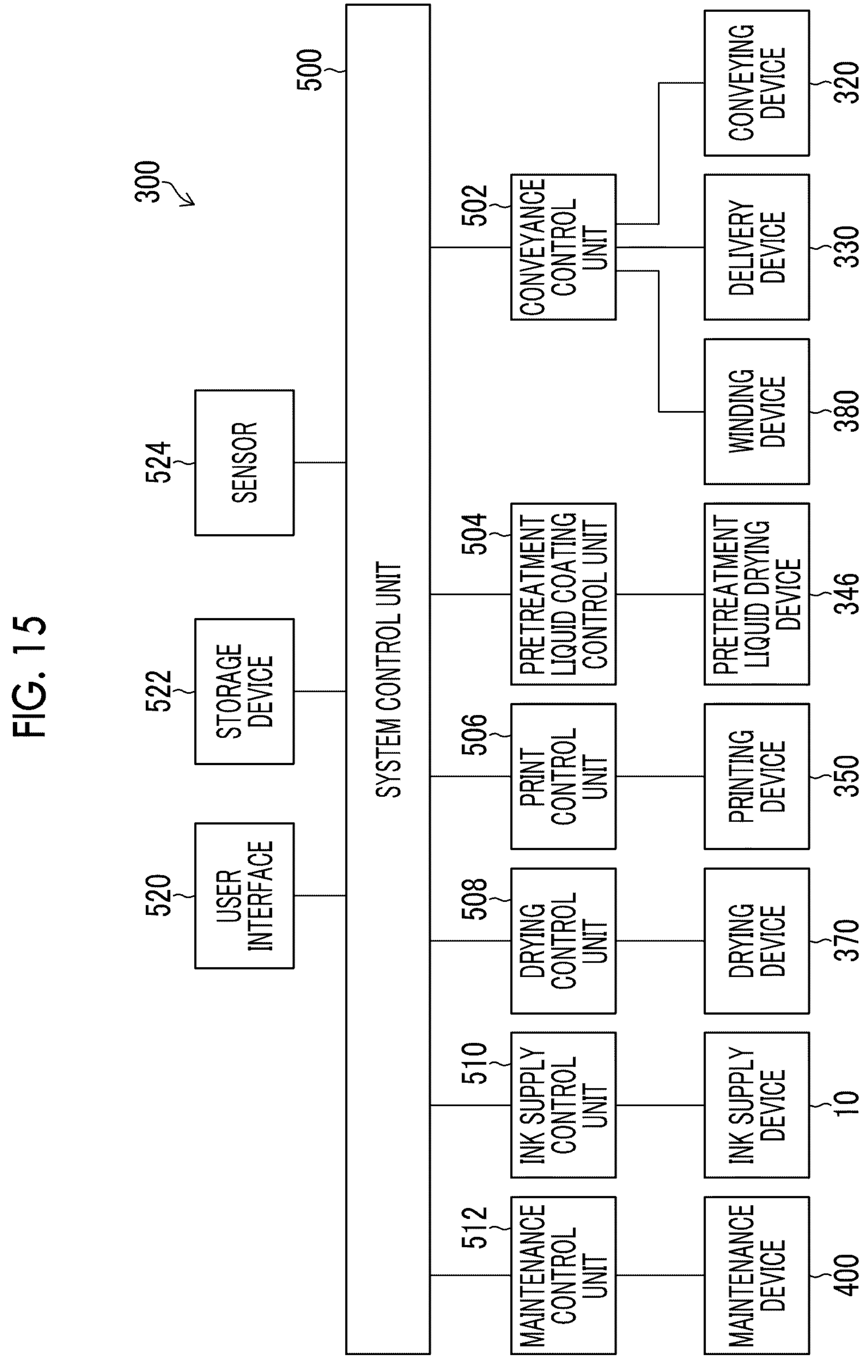
FIG. 15
300
500
SYSTEM CONTROL UNIT
520
USER INTERFACE
522
STORAGE DEVICE
524
SENSOR
502
CONVEYANCE CONTROL UNIT
504
PRETREATMENT LIQUID COATING CONTROL UNIT
506
PRINT CONTROL UNIT
508
DRYING CONTROL UNIT
510
INK SUPPLY CONTROL UNIT
512
MAINTENANCE CONTROL UNIT
CONVEYING DEVICE
320
DELIVERY DEVICE
330
WINDING DEVICE
380
PRETREATMENT LIQUID DRYING DEVICE
346
PRINTING DEVICE
350
DRYING DEVICE
370
INK SUPPLY DEVICE
10
MAINTENANCE DEVICE
400

LIQUID SUPPLY DEVICE, LIQUID JETTING SYSTEM, PRINTING SYSTEM, AND LIQUID CIRCULATION METHOD

CROSS-REFERENCE TO RELATED APPLICATIONS

The present application is a Continuation of PCT International Application No. PCT/JP2022/023587 filed on Jun. 13, 2022 claiming priority under 35 U.S.C § 119(a) to Japanese Patent Application No. 2021-140047 filed on Aug. 30, 2021. Each of the above applications is hereby expressly incorporated by reference, in its entirety, into the present application.

BACKGROUND OF THE INVENTION

1. Field of the Invention

The present invention relates to a liquid supply device, a liquid jetting system, a printing system, and a liquid circulation method.

2. Description of the Related Art

A white ink using pigment particles such as titanium oxide has a relatively large size of the pigment particles and a relatively high density of the pigment particles compared to color inks other than white. Then, in the white ink, the pigment particles precipitate in the ink, which may cause a jetting failure of an ink jet head in which the white ink is used.

JP6303327B discloses that an ink circulation path is provided in an ink supply path in order to prevent sedimentation of an inorganic white pigment in a case in which an ink composition containing the inorganic white pigment is used. In addition, JP6303327B discloses that an ink supply path may be provided without a circulation mechanism, or may comprise the circulation mechanism but without circulation in a case in which an ink composition that does not contain the inorganic white pigment is used.

JP6582453B discloses a printer comprising a printing head that jets a white ink. A device disclosed in JP6582453B comprises an ink circulation mechanism that circulates an ink between a tank that stores the ink and the printing head.

SUMMARY OF THE INVENTION

However, although JP6303327B and JP6582453B disclose that a white ink using titanium oxide that is likely to be sedimented is combined with ink circulation, there is no specific disclosure regarding the ink circulation. For example, JP6303327B and JP6582453B do not disclose a balance between the white ink and color inks other than the white ink in the ink circulation.

The present invention has been made in view of such circumstances, and an object of the present invention is to provide a liquid supply device, a liquid jetting system, a printing system, and a liquid circulation method capable of suppressing sedimentation of particles dispersed in a solvent in a case of circulating a liquid in which the particles are likely to be sedimented.

According to the present disclosure, there is provide a liquid supply device that supplies a liquid to a liquid jetting head, the liquid supply device comprising: a circulation flow passage that communicates with a circulation port of the liquid jetting head and communicates with a supply port of the liquid jetting head; a pressurization device that pressurizes a liquid inside the circulation flow passage; at least one processor; and at least one memory that stores a command to be executed by the at least one processor, in which the at least one processor is configured to control the pressurization device to pressurize the liquid in a case in which the liquid is circulated by using the circulation flow passage, and in a case in which a first liquid which has particles dispersed in a solvent and has a particle sedimentation characteristic different from that of a second liquid and in which the particles are likely to be sedimented is circulated as the liquid, apply, to the first liquid, a pressure that is equal to or more than 2.0 times and equal to or less than 3.5 times a pressure to be applied to the second liquid in a case in which the second liquid is circulated.

With the liquid supply device according to the present disclosure, a pressure to be applied to the first liquid in a case in which the first liquid in which the particles are more likely to be sedimented than the second liquid is circulated is set to be equal to or more than 2 times and equal to or less than 3.5 times the pressure in a case in which the second liquid is circulated. As a result, it is possible to suppress the sedimentation of the particles in a case in which the first liquid is circulated.

A case in which the second liquid is circulated includes a case in which the second liquid is circulated by using the circulation flow passage and the pressurization device in a case in which the second liquid is used instead of the first liquid as the liquid to be supplied to the liquid jetting head.

The first liquid and the second liquid may have a common major component of a solvent. The particles contained in the first liquid and the particles contained in the second liquid may be made of different materials from each other.

As the difference in sedimentation characteristics, a sedimentation velocity of the particles dispersed in the solvent can be applied.

In the liquid supply device according to another aspect, a filter for filtering the liquid may be attached to the circulation flow passage, and in a case in which the first liquid is used, the filter may be applied with a structure having a larger mesh size than in a case in which the second liquid is used.

According to such an aspect, occurrence of soft aggregation of the first liquid in the filter provided in the circulation flow passage is suppressed. As a result, it is possible to suppress clogging of the filter due to the occurrence of the soft aggregation of the first liquid.

In the liquid supply device according to another aspect, a filter for filtering the liquid may be attached to the circulation flow passage, and in a case in which the first liquid is used, the filter may be applied with a structure having a larger cross-sectional area than in a case in which the second liquid is used.

According to such an aspect, clogging of the filter in a case in which the first liquid is circulated can be suppressed.

In the liquid supply device according to another aspect, the first liquid may contain titanium oxide particles as pigment particles.

According to such an aspect, sedimentation of the titanium oxide particles in a case in which the first liquid containing titanium oxide as the pigment particles is circulated can be suppressed.

In the liquid supply device according to another aspect, in a case in which the first liquid is used, the pressurization device may have relatively higher pressurization performance than in a case in which the second liquid is used.

According to such an aspect, in a case in which the first liquid is circulated, shortening of the life of the pressurization device can be suppressed compared to a case in which the second liquid is circulated.

In the liquid supply device according to another aspect, a diameter of the particles contained in the first liquid may be larger than a diameter of particles contained in the second liquid.

In the liquid supply device according to another aspect, a density of the particles in the first liquid may be larger than a density of particles contained in the second liquid.

In the liquid supply device according to another aspect, a value obtained by subtracting a density of the solvent from a density of the particles in the first liquid may be larger than a value obtained by subtracting a density of a solvent from a density of particles in the second liquid.

According to the present disclosure, there is provided a liquid jetting system using a first liquid and a second liquid, the liquid jetting system comprising: a first liquid jetting head that jets a first liquid which has particles dispersed in a solvent and has a particle sedimentation characteristic different from that of the second liquid and in which the particles are likely to be sedimented; a first liquid supply device that supplies the first liquid to the first liquid jetting head and includes a first circulation flow passage which communicates with a circulation port of the first liquid jetting head and communicates with a supply port of the first liquid jetting head and a first pressurization device that pressurizes the first liquid inside the first circulation flow passage; a second liquid jetting head that jets the second liquid; and a second liquid supply device that supplies the second liquid to the second liquid jetting head and includes a second circulation flow passage which communicates with a circulation port of the second liquid jetting head and communicates with a supply port of the second liquid jetting head and a second pressurization device that pressurizes the second liquid inside the second circulation flow passage; at least one processor; and at least one memory that stores a command to be executed by the at least one processor, in which the at least one processor is configured to control the first pressurization device to pressurize the first liquid in a case in which the first liquid is circulated by using the first circulation flow passage, and in a case in which the first liquid is circulated, apply, to the first liquid, a pressure that is equal to or more than 2.0 times and equal to or less than 3.5 times a pressure to be applied to the second liquid in a case in which the second liquid is circulated by using the second circulation flow passage.

With the liquid jetting system according to the present disclosure, a pressure to be applied to the first liquid in a case in which the first liquid in which pigment particles are more likely to be sedimented than the second liquid is circulated is set to be equal to or more than 2 times and equal to or less than 3.5 times the pressure in a case in which the second liquid is circulated. As a result, it is possible to suppress the sedimentation of the pigment particles in a case in which the first liquid is circulated.

Configuration requirements of the liquid supply device according to another aspect can be applied to configuration requirements of the liquid jetting system according to another aspect.

In the liquid jetting system according to another aspect, the at least one processor may be configured to, in a case in which the first liquid is circulated during execution of a liquid jetting job in which printing is executed by using the first liquid jetting head, apply, to the first liquid, a pressure that is equal to or more than 2.0 times and equal to or less than 3.5 times the pressure in a case in which the second liquid is circulated.

According to such an aspect, in a case in which the first liquid is circulated during the execution of the liquid jetting job, the sedimentation of the pigment particles in the first liquid can be suppressed.

During the execution of the liquid jetting job, at least one of the first liquid jetting head or the second liquid jetting head need only execute liquid jetting.

In the liquid jetting system according to another aspect, the at least one processor may be configured to, in a case in which the first liquid is circulated during a standby time in which the liquid jetting job is not executed, reduce a pressure to be applied to the first liquid compared to a case in which the first liquid is circulated during the execution of the liquid jetting job.

According to such an aspect, in a case in which the first liquid is circulated during a standby time of the liquid jetting head, a load on the first pressurization device can be reduced compared with a case in which the first liquid is circulated during the execution of the liquid jetting job. As a result, it is possible to suppress shortening of the life of the first pressurization device.

The liquid jetting system according to another aspect may further comprise: a wiping device that wipes a nozzle surface of the first liquid jetting head, and the at least one processor may be configured to, in a case in which the first liquid is circulated in a case in which the nozzle surface of the first liquid jetting head is wiped by using the wiping device, reduce a pressure to be applied to the first liquid compared to a case in which the first liquid is circulated during the execution of the liquid jetting job.

According to such an aspect, in a case in which the first liquid is circulated during the wiping of the nozzle surface of the first liquid jetting head, a load on the first pressurization device can be reduced compared with a case in which the first liquid is circulated during the execution of the liquid jetting job. As a result, it is possible to suppress shortening of the life of the first pressurization device.

According to the present disclosure, there is provided a printing system that executes printing using a first ink and a second ink, the printing system comprising: a first ink jet head that jets a first ink which has particles dispersed in a solvent and has a particle sedimentation characteristic different from that of the second ink and in which the particles are likely to be sedimented; a first ink supply device that supplies the first ink to the first ink jet head and includes a first circulation flow passage which communicates with a circulation port of the first ink jet head and communicates with a supply port of the first ink jet head and a first pressurization device that pressurizes the first ink inside the first circulation flow passage; a second ink jet head that jets the second ink; a second ink supply device that supplies the second ink to the second ink jet head and includes a second circulation flow passage which communicates with a circulation port of the second ink jet head and communicates with a supply port of the second ink jet head and a second pressurization device that pressurizes the second ink inside the second circulation flow passage; at least one processor; and at least one memory that stores a command to be executed by the at least one processor, in which the at least one processor is configured to control the first pressurization device to pressurize the first ink in a case in which the first ink is circulated by using the first circulation flow passage, and in a case in which the first ink is circulated, apply, to the first ink, a pressure that is equal to or more than 2.0 times and equal to or less than 3.5 times a pressure to be applied to the second ink in a case in which the second ink is circulated by using the second circulation flow passage.

With the printing system according to the present disclosure, it is possible to obtain the same functions and effects as those of the liquid supply device according to the present disclosure. Configuration requirements of the liquid supply device according to another aspect and configuration requirements of the liquid jetting system according to another aspect can be applied to configuration requirements of the printing system according to another aspect.

According to the present disclosure, there is provided a liquid circulation method of, via a liquid supply device that supplies a liquid to a liquid jetting head, circulating a liquid from a circulation port of the liquid jetting head to a supply port of the liquid jetting head by using a circulation flow passage that communicates with the circulation port and communicates with the supply port, the liquid circulation method comprising: causing a computer to in a case in which the liquid is circulated by using the circulation flow passage, control a pressurization device to pressurize a liquid inside the circulation flow passage, and in a case in which a first liquid which contains particles and has a particle sedimentation characteristic different from that of a second liquid and in which the particles are likely to be sedimented is circulated as the liquid, apply, to the first liquid, a pressure that is equal to or more than 2.0 times and equal to or less than 3.5 times a pressure in a case in which the second liquid is circulated.

With the liquid circulation method according to the present disclosure, it is possible to obtain the same functions and effects as those of the liquid supply device according to the present disclosure. Configuration requirements of the liquid supply device according to another aspect and configuration requirements of the liquid jetting system according to another aspect can be applied to configuration requirements of the liquid circulation method according to another aspect.

According to the present invention, a pressure to be applied to the first liquid in a case in which the first liquid in which the particles are more likely to be sedimented than the second liquid is circulated is set to be equal to or more than 2 times and equal to or less than 3.5 times the pressure in a case in which the second liquid is circulated. As a result, it is possible to suppress the sedimentation of the particles in a case in which the first liquid is circulated.

BRIEF DESCRIPTION OF THE DRAWINGS

FIG. 5 is a table showing results of an evaluation experiment.

FIG. 6 is a graph showing a relationship between a pressure difference and the number of defective nozzles.

FIG. 11 is a plan view showing a configuration example of a maintenance device.

FIG. 15 is a functional block diagram showing an electric configuration of the printing system shown in FIG. 10.

DESCRIPTION OF THE PREFERRED EMBODIMENTS

Figure 1:
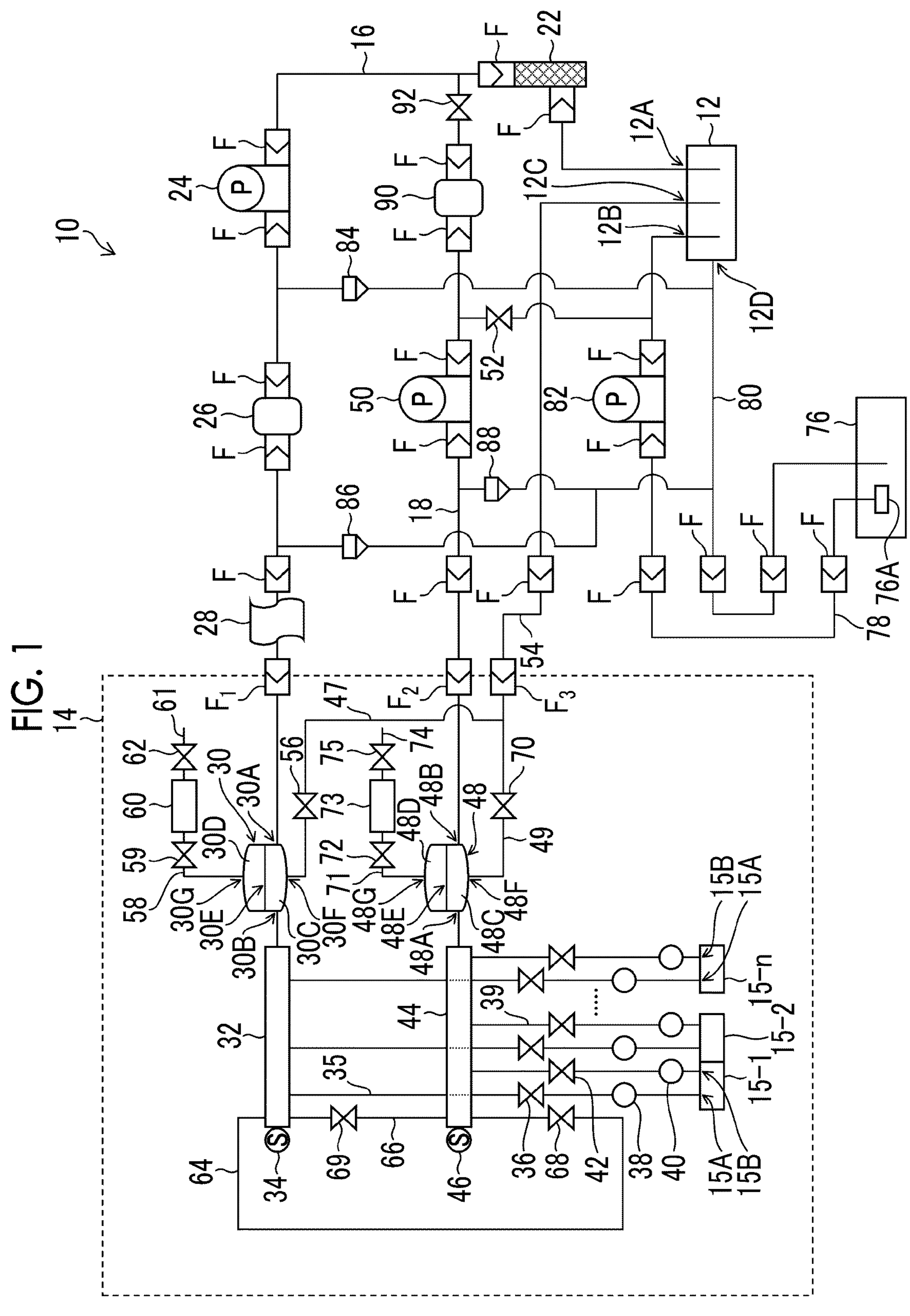
FIG. 1 is an overall configuration diagram of an ink supply device according to an embodiment.

Hereinafter, preferred embodiments of the present invention will be described with reference to the accompanying drawings. In the present specification, the same components are denoted by the same reference numerals, and duplicate description thereof will be omitted as appropriate.

[Overall Configuration of Ink Supply Device]

FIG. 1 is an overall configuration diagram of an ink supply device according to an embodiment. An ink supply device 10 is a device that supplies ink to an ink jet bar 14, and comprises a buffer tank 12, a supply flow passage 16, and a recovery flow passage 18.

In the buffer tank 12, ink to be supplied to the ink jet bar 14 is temporarily stored. The ink supply device 10 stably supplies ink from the buffer tank 12 to the ink jet bar 14 in accordance with the ink consumption of the ink jet bar 14.

The buffer tank 12 comprises a supply port 12A, a recovery port 12B, a bypass port 12C, and an overflow port 12D. The supply port 12A is connected to the supply flow passage 16 via a joint. The recovery port 12B is connected to the recovery flow passage 18 via a joint. The bypass port 12C is connected to a replenishment flow passage 78 via a joint. The overflow port 12D is connected to an overflow passage 80 via a joint. In FIG. 1, a joint that connects the buffer tank 12 and each flow passage is not shown.

The buffer tank 12 and the ink jet bar 14 communicate with each other through the supply flow passage 16 via a joint $F_1$. The ink jet bar 14 and the buffer tank 12 communicate with each other through the recovery flow passage 18 via a joint $F_2$. The ink stored in the buffer tank 12 is supplied to the ink jet bar 14 via the supply flow passage 16. In addition, the ink that is not used in the ink jet bar 14 is recovered to the buffer tank 12 via the recovery flow passage 18.

The supply flow passage 16 and the recovery flow passage 18 are configured to include a flow passage constituent member such as a tube. A flow passage control device, such as a pump or a valve, is connected to the supply flow passage 16 and the recovery flow passage 18 by using a joint F.

A deaeration module 22, a supply pump 24, a supply-side filter 26, and a heat exchanger 28 are connected to the supply flow passage 16 as a flow passage control device.

The deaeration module 22 performs a deaeration treatment on the ink passing through the supply flow passage 16. The supply pump 24 applies pressure to the ink inside the supply flow passage 16 to cause the ink inside the supply flow passage 16 to generate a flow. As the supply pump 24, a tube pump can be applied. The supply-side filter 26 removes air bubbles, foreign matter, and the like contained in the ink. The heat exchanger 28 adjusts a temperature of the ink.

A recovery pump 50 and a recovery flow passage valve 52 are connected to the recovery flow passage 18 as a flow passage control device. The recovery pump 50 applies pressure to the ink inside the recovery flow passage 18 to cause the ink inside the recovery flow passage 18 to generate a flow. As the recovery pump 50, a tube pump can be applied. The recovery flow passage valve 52 operates in response to a control signal to switch between opening and closing of the recovery flow passage 18 between the recovery pump 50 and the buffer tank 12.

The ink supply device 10 comprises an ink main tank 76, a replenishment flow passage 78, an overflow passage 80, and a replenishment pump 82. The replenishment flow passage 78 and the overflow passage 80 are provided with a joint F.

The ink main tank 76 stores the ink to be supplied to the buffer tank 12. The ink main tank 76 and the recovery port 12B of the buffer tank 12 communicate with each other through the replenishment flow passage 78 via a joint F. The ink main tank 76 and the overflow port 12D of the buffer tank 12 communicate with each other through the overflow passage 80 via a joint F.

The replenishment pump 82 applies pressure to the ink inside the replenishment flow passage 78 to cause the ink inside the replenishment flow passage 78 to generate a flow. As the replenishment pump 82, a tube pump can be applied. In accordance with the driving of the replenishment pump 82, the ink is replenished from the ink main tank 76 to the buffer tank 12.

A main tank filter 76A is provided at an end of the replenishment flow passage 78 on the side of the ink main tank 76. The main tank filter 76A removes foreign matter and the like from the ink replenished from the ink main tank 76 to the buffer tank 12.

In a case in which the buffer tank 12 is replenished with the ink in excess of a predetermined amount of the buffer tank 12, the ink is returned from the buffer tank 12 to the ink main tank 76 via the overflow port 12D and the overflow passage 80.

The ink supply device 10 comprises a first safety valve 84, a second safety valve 86, a third safety valve 88, a recovery-side filter 90, and a recovery-side filter valve 92.

In the ink supply device 10, in a case in which internal pressure of the supply flow passage 16 rises above a predetermined value, the first safety valve 84 and the second safety valve 86 operate to reduce the internal pressure of the supply flow passage 16. In addition, in the ink supply device 10, in a case in which internal pressure of the recovery flow passage 18 rises above a predetermined value, the third safety valve 88 operates to reduce the internal pressure of the recovery flow passage 18.

The recovery-side filter valve 92 operates in response to a control signal to switch between opening and closing between the recovery pump 50 and the deaeration module 22. The ink supply device 10 maintains the recovery-side filter valve 92 in an opened state, and allows the ink that has passed through the deaeration module 22 to pass through the recovery-side filter 90.

The ink supply device 10 comprises a bypass flow passage 54. A joint $F_3$ of the ink jet bar 14 and the bypass port 12C of the buffer tank 12 communicate with each other through the bypass flow passage 54. The bypass flow passage 54 is a flow passage through which the ink is fed from the ink jet bar 14 to the buffer tank 12 without passing through the recovery flow passage 18. The bypass flow passage 54 is provided with a joint F.

The ink supply device 10 shown in FIG. 1 may not be provided with the heat exchanger 28 or the like. For example, in a case in which it is unnecessary to adjust an ink temperature, such as a case in which an environmental temperature such as a room temperature is applied as the ink temperature, the heat exchanger 28 need not be provided.

In addition, in a case in which the buffer tank 12 has a function of the ink main tank 76, a flow passage control device such as the ink main tank 76, a flow passage connected to the ink main tank 76, such as the overflow passage 80, and a pump and a valve connected to the ink main tank 76 may not be provided.

The joint $F_1$ described in the embodiment is an example of a supply port of a liquid jetting head. The joint $F_2$ described in the embodiment is an example of a circulation port of the liquid jetting head. The supply flow passage 16 described in the embodiment is an example of a component of a circulation flow passage, and the recovery flow passage 18 described in the embodiment is an example of a component of the circulation flow passage.

[Example of Flow Passage Structure of Ink Jet Bar]

The ink jet bar 14 shown in FIG. 1 is a line-type ink jet head that comprises a plurality of head modules 15 and has a structure in which the plurality of head modules 15 are joined together. FIG. 1 illustrates the ink jet bar 14 comprising n pieces of the head modules 15. FIG. 1 shows three head modules denoted by reference numerals 15-1, 15-2, and **15-*n* among the n pieces of the head modules. The same applies to FIG. 4**.

The ink jet bar 14 is not limited to the aspect in which the plurality of head modules 15 are provided, and may adopt an aspect in which one head module 15 is provided. That is, n representing the number of the head modules 15 may be an integer of one or more.

The ink jet bar 14 comprises the supply-side back pressure tank 30. The supply-side back pressure tank 30 is a pressure buffering device that suppresses fluctuations in the internal pressure of the supply flow passage 16. The supply-side back pressure tank 30 communicates with the supply flow passage 16 via an ink inlet 30A and the joint $F_1$.

The supply-side back pressure tank 30 comprises an ink outlet 30B, a liquid chamber 30C, an air chamber 30D, an elastic film 30E, an air bubble discharge port 30F, and an air flow passage communication port 30G. The ink that has flowed in from the ink inlet 30A flows out from the ink outlet 30B via the liquid chamber 30C.

The elastic film 30E is disposed between the liquid chamber 30C and the air chamber 30D, and separates the liquid chamber 30C and the air chamber 30D. The elastic film 30E is deformed according to the pressure fluctuation of the ink passing through the liquid chamber 30C to reduce the pressure fluctuation of the ink passing through the liquid chamber 30C.

The air chamber 30D communicates with an air flow passage 58 via the air flow passage communication port 30G. The air chamber 30D and an air tank 60 communicate with each other through the air flow passage 58 via an air connect valve 59. The air tank 60 can communicate with an atmospheric communication path 61. The atmospheric communication path 61 is provided with an air valve 62.

The air bubble discharge port 30F of the liquid chamber 30C communicates with the bypass flow passage 54 via the drain flow passage 47 and the joint $F_3$. The drain flow passage 47 is provided with a drain valve 56. The drain valve 56 operates in response to a control signal to switch between opening and closing of the drain flow passage 47.

The ink jet bar 14 comprises the supply-side head manifold 32. The supply-side head manifold 32 communicates with the ink outlet 30B via the flow passage. The ink discharged from the supply-side back pressure tank 30 flows into the supply-side head manifold 32.

The supply-side head manifold 32 comprises a supply-side pressure sensor 34. The supply-side pressure sensor 34 detects internal pressure of the supply-side head manifold 32. The supply-side head manifold 32 is subjected to pressure control according to a detection result of the supply-side pressure sensor 34.

As the supply-side pressure sensor 34, a sensor of a semiconductor piezo resistance type, a capacitance type, a silicon resonant type, or the like can be applied. The same applies to a recovery-side pressure sensor 46.

The ink jet bar 14 comprises ink supply flow passages 35 as many as the number of the head modules 15. The supply-side head manifold 32 communicates with the head module 15 via the ink supply flow passage 35, and supplies the ink to the head module 15 via an ink supply port 15A via the ink supply flow passage 35.

Each of the ink supply flow passages 35 is provided with a supply valve 36 and a supply damper 38. In FIG. 1, only one of n pieces of the ink supply flow passages 35 is denoted by a reference numeral. The same applies to n pieces of the supply valves 36 and n pieces of the supply dampers 38.

The ink jet bar 14 comprises ink recovery flow passages 39 as many as the number of the head modules 15. The ink recovery flow passage 39 is connected to each of the head modules 15.

The ink jet bar 14 comprises a recovery-side head manifold 44. Each of the head modules 15 communicates with the recovery-side head manifold 44 via the ink recovery flow passage 39, and discharges the ink from an ink discharge port 15B to the recovery-side head manifold 44 via the ink recovery flow passage 39.

The recovery-side head manifold 44 comprises the recovery-side pressure sensor 46. The recovery-side pressure sensor 46 detects internal pressure of the recovery-side head manifold 44. The recovery-side head manifold 44 is subjected to pressure control according to a detection result of the recovery-side pressure sensor 46.

Each of the ink recovery flow passages 39 is provided with the recovery damper 40 and the recovery valve 42. In FIG. 1, only one of n pieces of the recovery dampers 40 is denoted by a reference numeral. The same applies to n pieces of the recovery valves 42.

The ink jet bar 14 comprises a recovery-side back pressure tank 48. The recovery-side back pressure tank 48 is a pressure buffering device that suppresses fluctuations in internal pressure of the recovery-side head manifold 44, and a flow passage between the recovery-side head manifold 44 and the recovery-side head manifold 44 and the joint $F_3$.

An ink inlet 48A of the recovery-side back pressure tank 48 communicates with the recovery-side head manifold 44 via a flow passage. The recovery-side back pressure tank 48 comprises an ink outlet 48B. The recovery-side back pressure tank 48 communicates with the recovery flow passage 18 via the ink outlet 48B and the joint $F_2$.

The recovery-side back pressure tank 48 comprises a liquid chamber 48C, an air chamber 48D, an elastic film 48E, and an air flow passage communication port 48G. Each of the liquid chamber 48C, the air chamber 48D, and the elastic film 48E has the same structure and function as the liquid chamber 30C, the air chamber 30D, and the elastic film 30E provided in the supply-side back pressure tank 30.

The air chamber 48D communicates with the air flow passage 71 via the air flow passage communication port 48G. The air flow passage 71 communicates the air chamber 48D and the air tank 73 via the air connect valve 72, and the air tank 73 communicates with the atmospheric communication path 74. The atmospheric communication path 74 is provided with an air valve 75.

An air bubble discharge port 48F of the liquid chamber 48C is connected to the bypass flow passage 54 via the drain flow passage 49 and the joint $F_3$. The drain flow passage 49 is provided with a drain valve 70. The drain valve 70 operates in response to a control signal to switch between opening and closing of the drain flow passage 49.

The ink jet bar 14 comprises a first bypass flow passage 64 and a second bypass flow passage 66. The supply-side head manifold 32 and the recovery-side head manifold 44 communicate with each other through the first bypass flow passage 64 and the second bypass flow passage 66.

The first bypass flow passage 64 is provided with a first bypass flow passage valve 68. The first bypass flow passage valve 68 operates in response to a control signal to switch between opening and closing of the first bypass flow passage 64. The second bypass flow passage 66 is provided with a second bypass flow passage valve 69. The second bypass flow passage valve 69 switches between opening and closing of the second bypass flow passage 66 in response to a control signal.

Among the components of the ink jet bar 14 shown in FIG. 1, components other than the head module 15, such as the supply-side back pressure tank 30 and the supply-side head manifold 32, may be components of the ink supply device 10. In such an aspect, an arrangement of the joint $F_1$ or the like that connects the ink supply device 10 and the ink jet bar 14 is changed as appropriate.

FIG. 1 illustrates the ink supply device 10 that supplies one color of ink to one ink jet bar 14. A printing system comprising a plurality of ink jet bars 14 respectively corresponding to a plurality of colors of ink comprises the ink supply device 10 for the number of colors.

Note that the configuration of the ink supply device 10 shown in FIG. 1 is an example, and components can be added, changed, or deleted as appropriate.

In the present embodiment, the aspect in which the ink is supplied from the ink supply device 10 to the ink jet bar 14 has been illustrated, but the ink supply device 10 may adopt an aspect in which a liquid other than the ink, such as a functional liquid, is supplied to a liquid supply target device.

The ink supply device 10 described in the embodiment is an example of a liquid supply device. The ink jet bar 14 described in the embodiment is an example of the liquid jetting head.

[Electric Configuration of Ink Supply Device]

Figure 2:
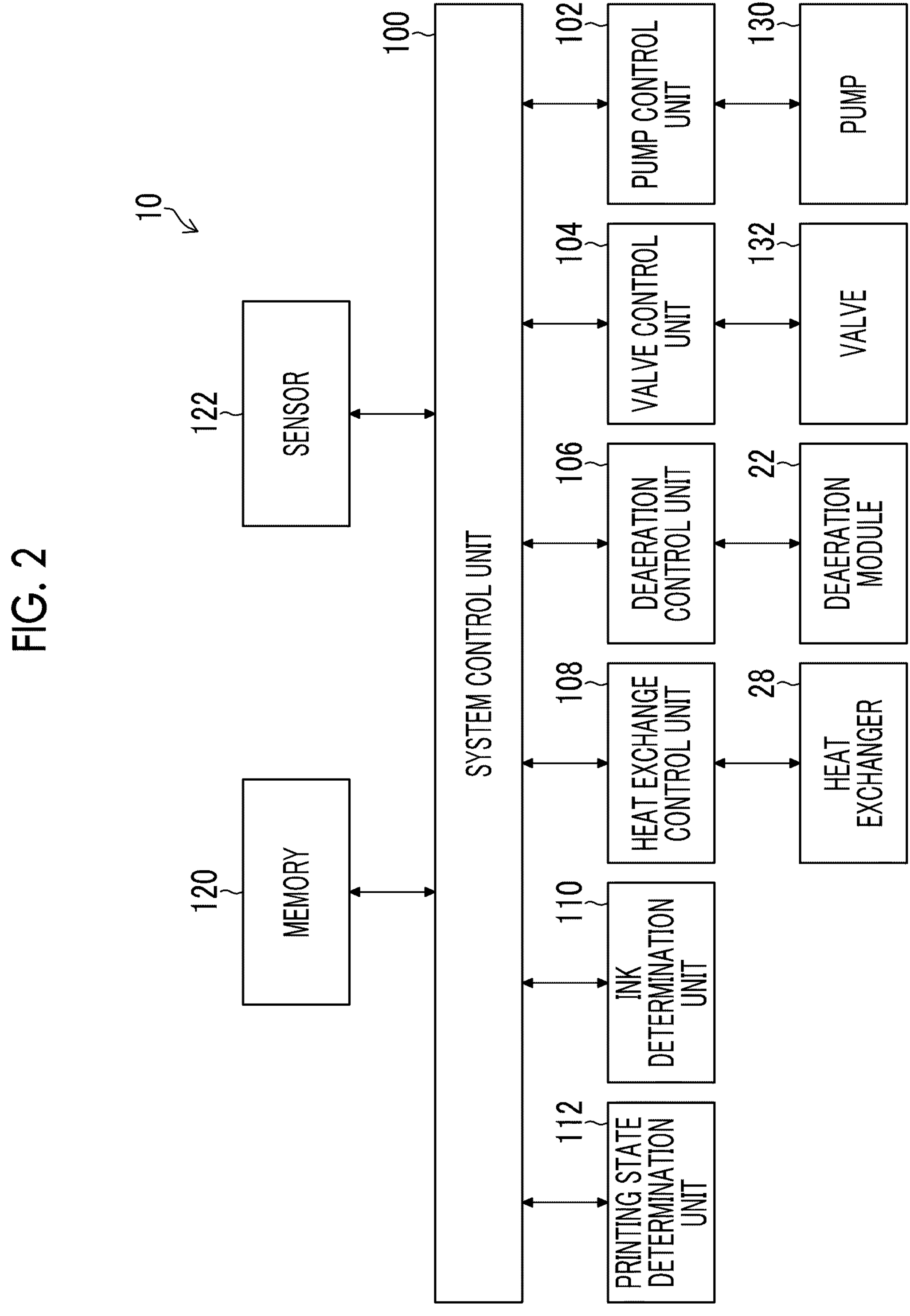
FIG. 2 is a functional block diagram showing an electric configuration of the ink supply device shown in FIG. 1.

FIG. 2 is a functional block diagram showing an electric configuration of the ink supply device shown in FIG. 1. The ink supply device 10 comprises a system control unit 100, a pump control unit 102, a valve control unit 104, a deaeration control unit 106, and a heat exchange control unit 108.

The system control unit 100 transmits a command signal to the pump control unit 102, the valve control unit 104, the deaeration control unit 106, and the heat exchange control unit 108 to integrally control an operation of the ink supply device 10.

The pump control unit 102 controls an operation of a pump 130 in response to a command signal transmitted from the system control unit 100. The pump 130 shown in FIG. 2 includes the supply pump 24, the recovery pump 50, and the replenishment pump 82 shown in FIG. 1.

That is, the pump control unit 102 controls the operation of various pumps provided in the flow passage through which the ink returning from the buffer tank 12 to the buffer tank 12 via the ink jet bar 14 passes, and defines a flow velocity of the ink and a flow direction of the ink.

The valve control unit 104 controls an operation of a valve 132 in response to a command signal transmitted from the system control unit 100. The valve 132 shown in FIG. 2 includes the recovery flow passage valve 52, the recovery-side filter valve 92, and the like shown in FIG. 1. The valve 132 shown in FIG. 2 may include various valves such as the drain valve 56 and the drain valve 70 provided in the ink jet bar 14 shown in FIG. 1.

That is, the valve control unit 104 switches between opening and closing of various valves provided in a flow passage through which the ink returning from the buffer tank 12 to the buffer tank 12 via the ink jet bar 14 passes, and defines the flow passage through which the ink passes.

The deaeration control unit 106 controls an operation of the deaeration module 22 in response to a command signal transmitted from the system control unit 100, and executes a deaeration treatment on the ink supplied from the buffer tank 12 to the ink jet bar 14.

The heat exchange control unit 108 controls an operation of the heat exchanger 28 in response to a command signal transmitted from the system control unit 100, and executes temperature adjustment of the ink supplied from the buffer tank 12 to the ink jet bar 14.

The ink supply device 10 comprises an ink determination unit 110 and a printing state determination unit 112. The system control unit 100 determines a type of an ink to be used in the ink supply device 10 based on an ink determination result transmitted from the ink determination unit 110. The system control unit 100 executes control of the ink supply device 10 according to the type of the ink.

In addition, the system control unit 100 determines whether the printing system is in a printing state or in a non-printing state based on a signal transmitted from the printing state determination unit 112. The system control unit 100 executes control of the ink supply device 10 according to the state of the printing system.

The ink supply device 10 comprises a memory 120. The memory 120 stores various data, various parameters, various programs, and the like used for controlling the ink supply device 10. The system control unit 100 executes control of each part of the ink supply device 10 by applying various parameters and the like stored in the memory 120.

The ink supply device 10 comprises a sensor 122. The sensor 122 shown in FIG. 2 includes various sensors provided in the ink supply device 10, such as a temperature sensor and a pressure sensor. The sensor 122 may include various sensors such as the supply-side pressure sensor 34 provided in the ink jet bar 14 shown in FIG. 1.

[Configuration of Hardware of Ink Supply Device]

Figure 3:
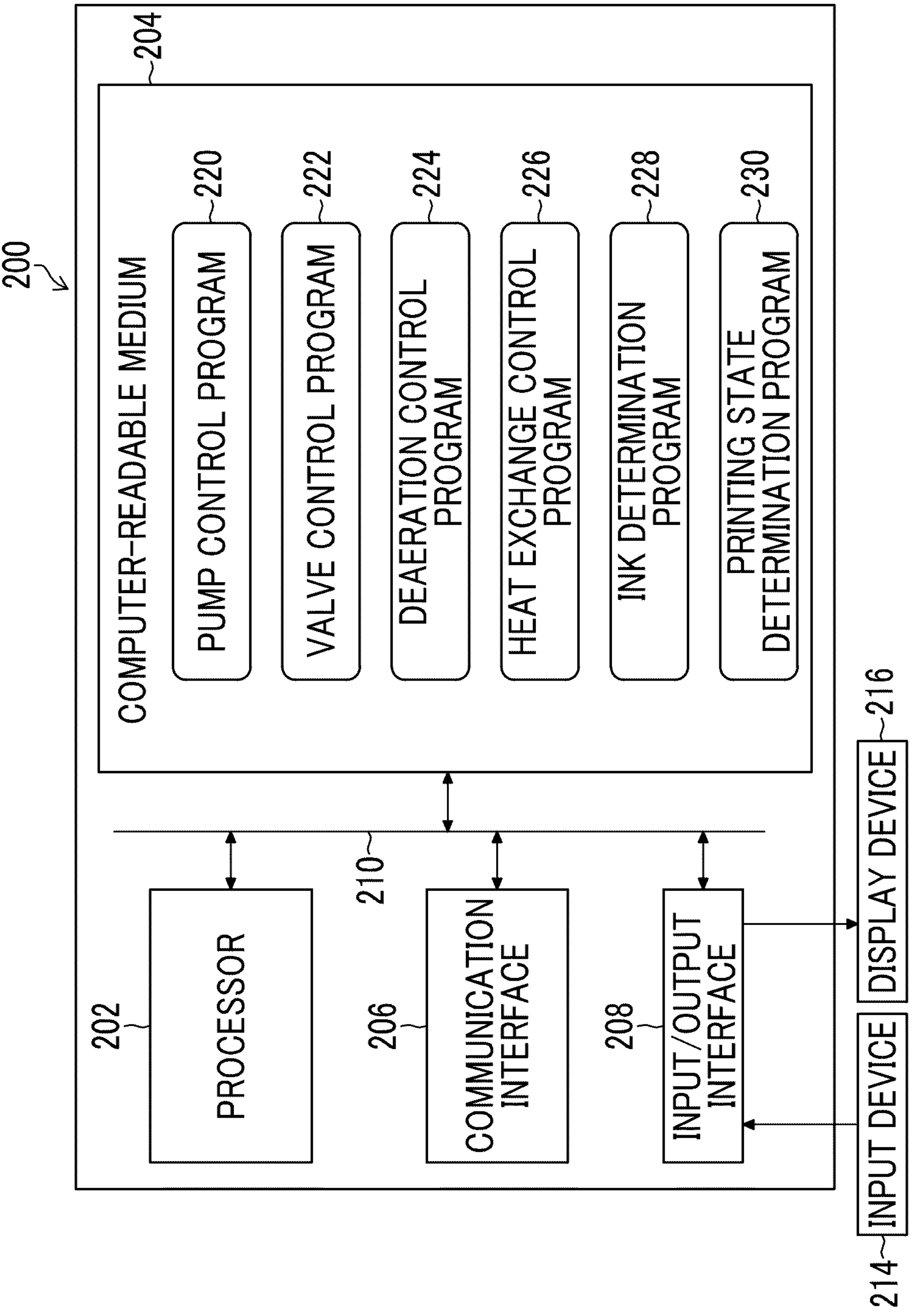
FIG. 3 is a block diagram showing a configuration example of hardware of the ink supply device shown in FIG. 1.

FIG. 3 is a block diagram showing a configuration example of hardware of the ink supply device shown in FIG. 1. A control device 200 provided in the ink supply device 10 comprises a processor 202, a non-temporary tangible computer-readable medium 204, a communication interface 206, and an input/output interface 208.

A computer is applied as the control device 200. A form of the computer may be a server, a personal computer, a workstation, a tablet terminal, and the like.

The processor 202 comprises a central processing unit (CPU) which is a general-purpose processing device. The processor 202 may comprise a graphics processing unit (GPU) which is a processing device specialized in image processing.

The processor 202 is connected to the computer-readable medium 204, the communication interface 206, and the input/output interface 208 via a bus 210. An input device 214 and a display device 216 are connected to the bus 210 via the input/output interface 208.

The computer-readable medium 204 comprises a memory which is a main memory and a storage which is an auxiliary memory. A semiconductor memory, a hard disk apparatus, a solid state drive apparatus, and the like can be applied as the computer-readable medium 204. Any combination of a plurality of devices can be applied as the computer-readable medium 204.

The hard disk apparatus can be referred to as an HDD which is an abbreviation for Hard Disk Drive in English. The solid state drive apparatus can be referred to as an SSD which is an abbreviation for Solid State Drive in English.

The control device 200 is connected to a network via the communication interface 206, and is communicably connected to an external device. A local area network (LAN) and the like can be used as the network. The network is not shown.

The computer-readable medium 204 stores a pump control program 220, a valve control program 222, a deaeration control program 224, a heat exchange control program 226, an ink determination program 228, and a printing state determination program 230. The computer-readable medium 204 can function as the memory 120 shown in FIG. 2.

The pump control program 220 corresponds to operation control applied to the pump 130 shown in FIG. 2. The valve control program 222 corresponds to operation control applied to the valve 132. The deaeration control program 224 corresponds to deaeration control applied to the deaeration module 22. The heat exchange control program 226 corresponds to ink temperature control applied to the heat exchanger 28. The ink determination program 228 corresponds to processing of determining the type of the ink. The printing state determination program 230 corresponds to processing of determining the printing state.

Various programs stored in the computer-readable medium 204 include one or more commands. The computer-readable medium 204 stores various data, various parameters, and the like.

In the ink supply device 10, the processor 202 executes various programs stored in the computer-readable medium 204 to realize various functions in the ink supply device 10. The term "program" is synonymous with the term "software".

The control device 200 executes data communication with an external device via the communication interface 206. Various standards such as universal serial bus (USB) can be applied to the communication interface 206. As a communication form of the communication interface 206, either wired communication or wireless communication may be applied.

The input device 214 and the display device 216 are connected to the control device 200 via the input/output interface 208. An input device such as a keyboard or a mouse is applied as the input device 214. The display device 216 displays various information applied to the control device 200.

A liquid crystal display, an organic EL display, a projector, and the like can be applied as the display device 216. Any combination of a plurality of devices can be applied as the display device 216. The term "EL" of an organic EL display is an abbreviation for Electro-Luminescence.

Here, examples of a hardware structure of the processor 202 include a CPU, a GPU, a programmable logic device (PLD), and an application specific integrated circuit (ASIC). The CPU is a general-purpose processor that executes a program and acts as various functional units. The GPU is a processor specialized in image processing.

The PLD is a processor capable of changing a configuration of an electric circuit after manufacturing a device. An example of the PLD is a field programmable gate array (FPGA). The ASIC is a processor comprising a dedicated electric circuit specifically designed to execute a specific process.

One processing unit may be configured by one of these various processors or may be composed of two or more processors of the same type or different types. Examples of a combination of various processors include a combination of one or more FPGAs and one or more CPUs, and a combination of one or more FPGAs and one or more GPUs. Another example of a combination of various processors includes a combination of one or more CPUs and one or more GPUs.

A plurality of functional units may be configured by using one processor. As an example of configuring a plurality of functional units by using one processor, there is an aspect in which, as typified by a computer such as a client or a server, a combination of one or more CPUs and software such as a system on a chip (SoC) is applied to configured one processor, and the processor is caused to act as a plurality of functional units.

As another example of configuring a plurality of functional units by using one processor, there is an aspect in which a processor that realizes functions of an entire system including a plurality of functional units by using one IC chip is used. Note that IC is an abbreviation for integrated circuit.

As described above, the various functional units are configured by using one or more of the above described various processors as a hardware structure. Furthermore, the hardware structure of the above described various processors is, more specifically, an electric circuit (circuitry) in which circuit elements such as semiconductor elements are combined.

The computer-readable medium 204 may include a semiconductor element such as a read only memory (ROM) or a random access memory (RAM). The computer-readable medium 204 may include a magnetic storage medium such as a hard disk. The computer-readable medium 204 may be provided with a plurality of types of storage media.

[Detailed Description of Ink Circulation]

Figure 10:
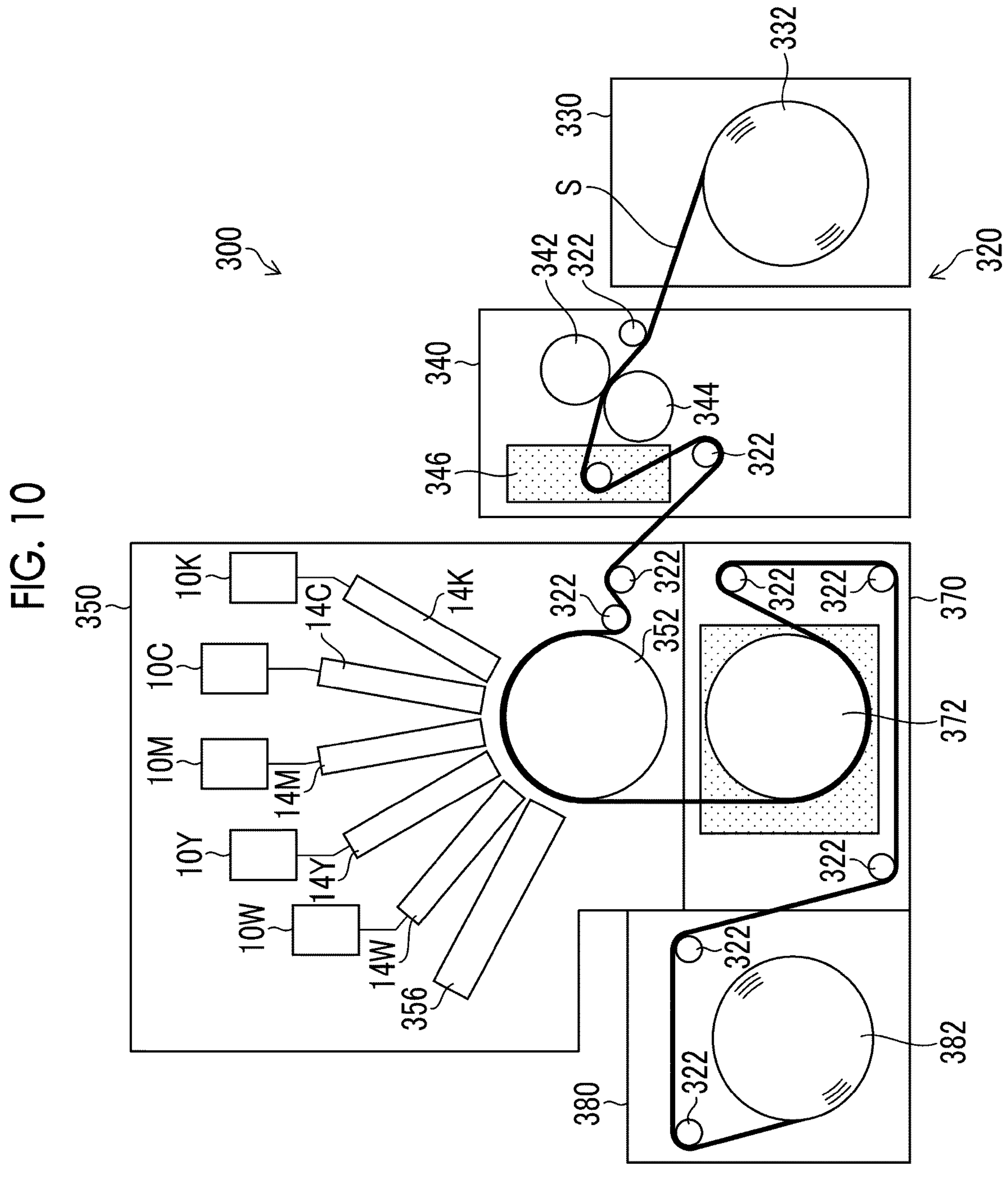
FIG. 10 is an overall configuration diagram of a printing system according to the embodiment.

Next, ink circulation applied to the ink supply device 10 will be described in detail. The ink supply device 10 adopts an ink circulation method that is effective for stable printing in a printing system which is an ink supply destination. The printing system is shown in FIG. 10 with reference numeral "300" given thereto.

Figure 4:
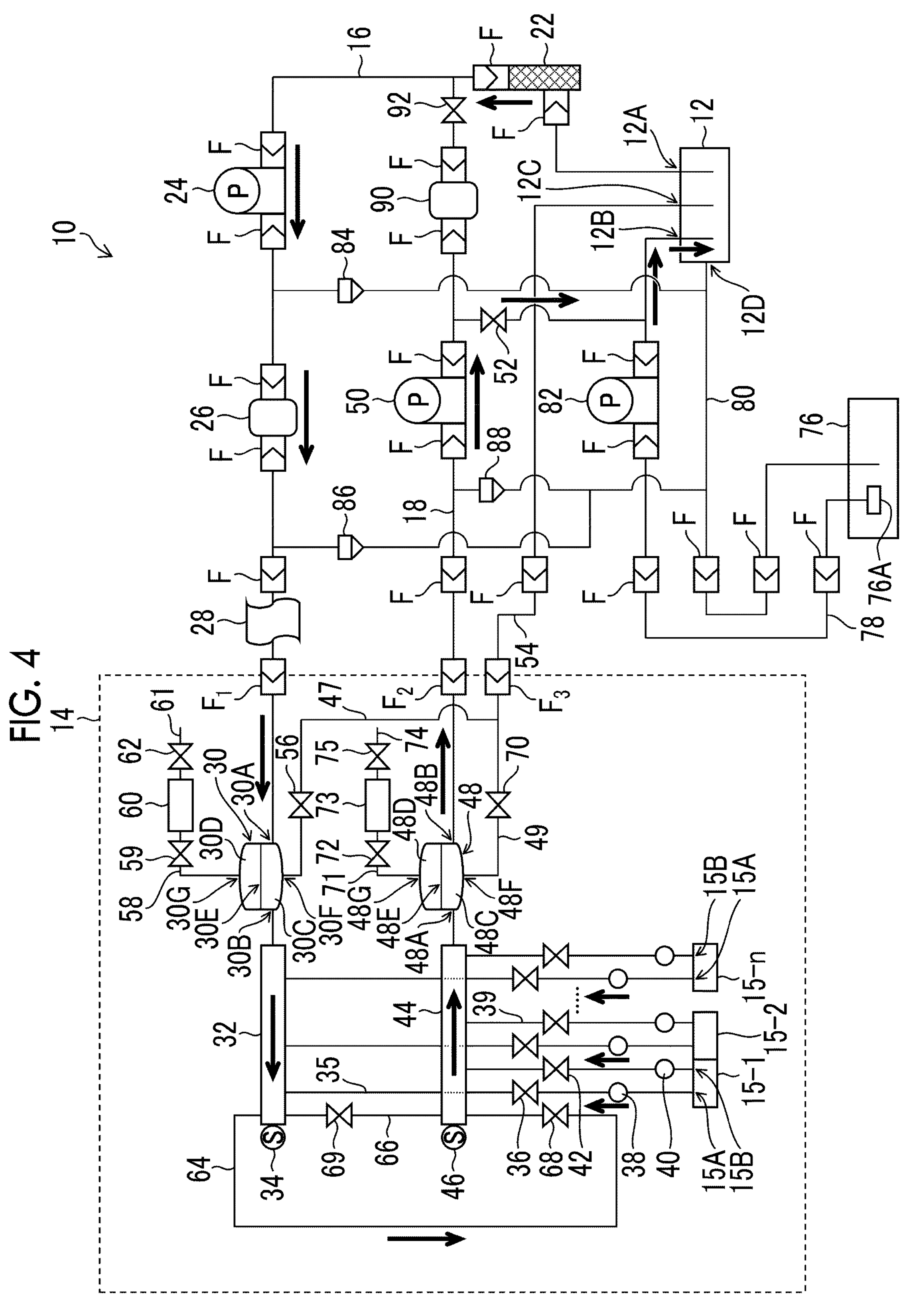
FIG. 4 is a schematic diagram showing a main ink flow in ink circulation.

FIG. 4 is a schematic diagram showing a main ink flow in the ink circulation. FIG. 4 shows a flow of an ink during the ink circulation in the configuration of the ink supply device 10 shown in FIG. 1 by using arrow lines.

In the ink circulation, the drain valve 56, the drain valve 70, and the recovery-side filter valve 92 are closed, and the ink is supplied from the buffer tank 12 to the ink jet bar 14 via the deaeration module 22, the supply pump 24, the supply-side filter 26, and the heat exchanger 28. The temperature of the ink supplied to the ink jet bar 14 is adjusted within a specified range using the heat exchanger 28. Examples of the specified range include a range of 23° C. or higher and 25° C. or lower.

The ink supplied to the ink jet bar 14 passes through the supply-side back pressure tank 30, the supply-side head manifold 32, the first bypass flow passage 64, the recovery-side head manifold 44, and the recovery-side back pressure tank 48, and is discharged from the ink jet bar 14. In addition, the ink recovered from the head module 15 is discharged from the ink jet bar 14 via the recovery-side head manifold 44 and the recovery-side back pressure tank 48.

The ink discharged from the ink jet bar 14 is returned from the recovery port 12B to the buffer tank 12 via the recovery pump 50 and the recovery flow passage valve 52. In this way, the ink circulation is executed between the buffer tank 12 and the ink jet bar 14.

The joint $F_1$ described in the embodiment is an example of a supply port of the liquid jetting head. The joint $F_2$ described in the embodiment is an example of a circulation port of the liquid jetting head. The supply flow passage 16 described in the embodiment is an example of a component of a circulation flow passage, and the recovery flow passage 18 described in the embodiment is an example of a component of the circulation flow passage.

In the printing system to which the ink supply device 10 is applied, the ink supply device 10 is provided for each ink color. In a case in which one ink jet bar 14 is provided for one color, each color has the same meaning as each ink jet bar 14. Each ink jet bar 14 for each color is provided with an individual ink supply device 10.

The printing system provided with the ink supply device 10 always executes the ink circulation during execution of the printing. Of course, in a case in which a trouble has occurred in the ink supply device 10, or in a case in which maintenance processing of the ink jet bar 14 is executed, the ink circulation may be temporarily stopped during execution of the printing, but in order to achieve stable operation of the printing system, it is effective to continue the ink circulation as much as possible during execution of the printing.

In the printing system to which the ink supply device 10 is applied, a white ink is used in addition to color inks of black, cyan, magenta, and yellow. The white ink contains titanium oxide particles as pigment particles. The white ink may be referred to as a white-colored ink.

The titanium oxide particles have, for example, a density of about 4.2 grams per cubic centimeter, which is higher than that of pigment particles of other colors having a density of about 1.5 grams per cubic centimeter to 2.0 grams per cubic centimeter.

In addition, the titanium oxide particles have, for example, a diameter of about 200 nanometers to 300 nanometers, which is larger than that of pigment particles of other colors having a diameter of about 100 nanometers to 150 nanometers. As the diameter of the particles, a diameter of a sphere in a case in which a shape of the particles is assumed to be a sphere can be applied. In the white ink in which the density of the pigment particles is relatively high and the diameter of the pigment particles is relatively large, the pigment particles are more likely to precipitate in the flow passage than in other color inks.

A sedimentation velocity may be applied as an indicator of ease of precipitation of particles. The unit of the sedimentation velocity is meters per second. A diameter of the particles is denoted by $D_p$ meters, a density of the particles is denoted by pp kilograms per cubic centimeter, and a density of the solvent is denoted by $\rho_f$ kilograms per cubic centimeter.

A viscosity of the solvent is denoted by μ-Newton seconds per square meter, and a gravitational acceleration is denoted by g-Newton per kilogram. The sedimentation velocity $v_s$ of the pigment particles in the ink is expressed by Equation 1 to which Stokes equation is applied.

$$v_s = \{D_p^2 \times (\rho_p - \rho_f) \times g\}/(18 \times \mu) \quad \text{Equation 1}$$

The sedimentation velocity $v_s$ shown in Equation 1 is proportional to the square of the diameter $D_p$ of the particles and is proportional to a value $\rho_p-\rho_f$ obtained by subtracting the density $\rho_f$ of the solvent from the density $\rho_p$ of the particles.

A difference in sedimentation velocity $v_s$ of 10 times or more may occur between a typical pigment applied to color inks other than the white ink and the pigment applied to the white ink. For example, in a case in which the diameter $D_p$ of the typical pigment is 100 nanometers and the density $\rho_p$ of the typical pigment is 1.6 grams per cubic centimeter, the sedimentation velocity $v_s$ is 0.01 micrometers per second.

In a case in which the diameter $D_p$ of the pigment applied to the white ink is 200 nanometers and the density $\rho_p$ of the pigment applied to the white ink is 4.2 grams per cubic centimeter, the sedimentation velocity $v_s$ is 0.25 micrometers per second. That is, it can be said that the pigments in the white ink sink about 25 times faster than the pigments in other color inks.

Here, it has been described that sedimentation of the pigments is more likely to occur in the white ink than in other color inks. It can be said that sedimentation of pigments is likely to occur in an ink containing a pigment having a relatively large density of particles and an ink containing a pigment having a relatively large diameter of the particles, as with the white ink.

For example, in a case in which two or more types of inks are used, and the sedimentation velocity $v_s$ of any one type of ink, which is represented by Equation 1, is equal to or more than 10 times the sedimentation velocity $v_s$ of the other type of ink, the one type of ink can be treated as one in which sedimentation of pigments is more likely to occur than in other inks.

As parameters for specifying an ink that is likely to be sedimented, a ratio of the diameter $D_p$ of the particles and a ratio of the value $\rho_p-\rho_f$ obtained by subtracting the density $\rho_f$ of the solvent from the density $\rho_p$ of the particles, which are used in Equation 1, may be applied. For example, in a case in which the ratio of the diameter $D_p$ of the particles used is 2 times or more, the ink in which the diameter $D_p$ of the particles is large with respect to the ink in which the diameter $D_p$ of the particles is small can be specified as an ink that is likely to be sedimented.

Similarly, in a case in which the ratio of the value $\rho_p-\rho_f$ obtained by subtracting the density $\rho_f$ of the solvent from the density pp of the particles is 3 times or more, the ink in which the density $\rho_p$ of the particles is large with respect to the ink in which the density $\rho_p$ of the particles is small can be specified as an ink that is likely to be sedimented.

An upper limit value of the ratio of the diameter $D_p$ of the particles used and an upper limit value of the ratio of the value $\rho_p-\rho_f$ obtained by subtracting the density $\rho_f$ of the solvent from the density $\rho_p$ of the particles can be defined from the viewpoint of whether or not normal jetting can be executed.

The ratio of the sedimentation velocity $v_s$, the ratio of the diameter $D_p$ of the particles, and the ratio of the value $\rho_p-\rho_f$ obtained by subtracting the density $\rho_f$ of the solvent from the density $\rho_p$ of the particles, which are described in the embodiment, are examples of the sedimentation characteristic of the particles.

Hereinafter, a case in which a SAMBA G3L print head manufactured by FUJIFILM Dimatix, Inc. is used will be described. The SAMBA G3L print head may be referred to as a SAMBA print head.

The SAMBA print head has a structure for circulating an ink to a periphery of a nozzle. In other words, in the SAMBA print head, an individual circulation flow passage is connected to a position in the vicinity of a nozzle opening, and the ink in the vicinity of the nozzle opening can be circulated. As a result, sedimentation of pigments inside the SAMBA print head is suppressed, and it is possible to realize and maintain stable jetting performance.

It is derived from an experiment that in a case in which color inks other than the white ink, such as a cyan ink and a magenta ink, are used for the SAMBA print head, a pressure difference for pressurizing the ink which is set during the ink circulation is preferably about 2500 pascals. The pressure difference referred to here can be grasped as a value obtained by subtracting a measured value of the supply-side pressure sensor 34 from a measured value of the recovery-side pressure sensor 46 shown in FIG. 4. An absolute value of a subtraction value may be applied to the pressure difference. The absolute value of the subtraction value can be grasped as the pressure.

The preferred value of the above-described pressure difference is determined from various viewpoints, such as continuous jetting stability performance, recovery performance of jetting stability in a case of non-jetting for a certain period, a load on the pump contributing to the ink circulation, and suppression of a shear load on the ink of the filter provided with the flow passage.

As described above, sedimentation of the pigments is more likely to occur in the white ink than in other color inks. Therefore, also for the white ink, a preferred range of a pressure difference for pressurizing the ink which is set during the ink circulation was derived based on the results of the evaluation experiment.

That is, it was found that it is necessary to increase the pressure difference applied to the ink circulation of the white ink compared to the pressure difference applied to the ink circulation of other color inks. In a case in which the pressure difference applied to the ink circulation of the white ink is increased compared to the pressure difference applied to the ink circulation of other color inks, an adverse effect caused by the sedimentation of the pigments contained in the white ink can be effectively suppressed.

In addition, it was found that the pressure difference applied to the ink circulation of the white ink is preferably equal to or more than 2.0 times and equal to or less than 3.5 times the pressure difference applied to the ink circulation of other color inks. The following shows an evaluation experiment and the experimental results of the pressure difference for pressurizing the ink which is set during the ink circulation.

[Evaluation Experiment]

The white ink is supplied to the SAMBA print head, and a state is made such that white ink printing can be executed using the SAMBA print head. The white ink contains titanium oxide particles as a pigment. In the white ink, the density $\rho_p$ of the solvent is 1100 kilograms per cubic meter, and the viscosity u of the solvent is 0.005 Newton seconds per square meter. The gravitational acceleration g of Equation 1 is 9.8 Newton per kilogram.

A jetting state at the start of the printing, a jetting state after a situation in which sedimentation of the pigment may occur inside the head without performing jetting during the printing, and a jetting state after a recovery operation in which dummy jet is executed after a period of no jetting has passed were evaluated.

In the evaluation of the jetting state, a test image was printed on a print sample using all nozzles provided in the SAMBA print head, and the presence or absence of a pattern constituting the test image and the positional deviation of the pattern were analyzed for each nozzle. As printing conditions in printing the test image, printing conditions in printing the test image in a case in which jetting failure detection was executed were applied.

Based on the analysis results, the nozzles provided in the SAMBA print head were classified into a normal nozzle and a defective nozzle, and the jetting state was classified into four stages according to the number of the defective nozzles. The setting of the pressure difference applied to the ink circulation was changed, the above-described procedure was executed for each setting of the pressure difference, and the evaluation result of the jetting state for each pressure difference was derived.

In a case in which a pattern that should be present was not present, a nozzle corresponding to the pattern was classified as a non-jetting nozzle that cannot jet. In addition, in a case in which the positional deviation of the pattern exceeded a specified allowable range, a nozzle corresponding to the pattern was classified as a nozzle having poor straightness in jetting. The number of the defective nozzles was calculated as the sum of the number of the non-jetting nozzles and the number of the nozzles having poor straightness in jetting.

As operating conditions of the SAMBA print head, such as a jetting frequency, general-purpose conditions among operating conditions applied in a case of manufacturing a printed material were applied.

[Result of Evaluation Experiment]

FIG. 5 is a table showing results of the evaluation experiment. FIG. 5 shows a relationship between the pressure difference which is set during the ink circulation of the white ink and the jetting state of the white ink. The multiple described in the column of the pressure difference of the table shown in FIG. 5 is a multiple of the pressure difference applied to the white ink with respect to the pressure difference applied to other color inks.

The evaluation "A" described in the column of the ink jetting state in FIG. 5 indicates a good jetting state. The evaluation "B" indicates the jetting state within the allowable range, although the number of the defective nozzles is large and the jetting state deteriorates compared to the evaluation "A".

The evaluation "C" indicates that the number of the defective nozzles is large and the jetting state deteriorates compared to the evaluation "B", and the jetting state exceeds the allowable range. The evaluation "D" indicates that the number of the defective nozzles is large and the jetting state deteriorates compared to the evaluation "C", the jetting state exceeds the allowable range, and the jetting state is worse than the evaluation "C".

The results of the evaluation experiment shown in FIG. 5 show that in a case in which the pressure difference applied to other color inks is 2500 pascals, the pressure difference applied to the white ink is preferably 5000 pascals or more and 8750 pascals or less.

Although FIG. 5 shows a case in which the pressure difference applied to other color inks is 2500 pascals, it is considered that the same results as the results of the evaluation experiment shown in FIG. 5 can be obtained even in a case in which any pressure difference that maintains a good jetting state for other color inks is applied.

In the evaluation experiment described above, a difference between the white ink and other inks is mainly a difference in pigment, and the components other than the pigment, such as a solvent, are the same. Then, the preferred ink circulation conditions of the white ink can be grasped as relative conditions with respect to the preferred ink circulation conditions of other inks.

FIG. 6 is a graph showing a relationship between the pressure difference and the number of the defective nozzles. The pressure difference in units of pascal is applied to a horizontal axis of the graph shown in FIG. 6. A vertical axis of the graph shown in FIG. 6 represents the number of the defective nozzles.

The horizontal axis of the graph shown in FIG. 6 includes a normal state, a state after being left to stand, and a state after recovery jetting, for each pressure difference. The normal state corresponds to the jetting state at the start of the printing. The state after being left to stand corresponds to the jetting state after a situation in which sedimentation of the pigment may occur. The state after recovery jetting corresponds to the jetting state after the recovery operation.

As shown in FIG. 6, it can be seen that in a case in which the pressure difference is 5000 pascals or more and 8750 pascals or less, the deterioration of the jetting state after being left to stand is also suppressed, and the jetting state after recovery jetting is also recovered to a good state.

On the other hand, in a case in which the pressure difference is 3750 pascals or less, it is relatively slow to return from the jetting state after being left to stand to a good jetting state, which may cause an adverse effect on the print quality. That is, in a case in which the pressure difference is 3750 pascals or less, the jetting state after recovery jetting is not recovered to the normal jetting state, and it is necessary to increase the number of times of recovery jetting to recover the jetting state after being left to stand to the normal jetting state.

On the other hand, it is not simple to determine whether it would be good to make the pressure difference relatively large. For example, in a case in which the pressure difference is 10000 pascals, the jetting state after being left to stand is worse than in a case in which the pressure difference is 5000 pascals or more and 8750 pascals or less.

In a case in which the pressure difference exceeds 8750 pascals, such as a case in which the pressure difference is 10000 pascals, it is presumed that the ink circulation speed is too fast, the state of the ink around the nozzle is unstable, and the jetting state is relatively bad.

From the experimental results of the evaluation experiment shown in FIG. 6, it can be said that the pressure difference applied to the ink circulation of the white ink is preferably equal to or more than 2.0 times and equal to or less than 3.5 times the pressure difference applied to the ink circulation of other color inks, as shown in FIG. 5.

[Procedure of Ink Circulation Method]

Figure 7:
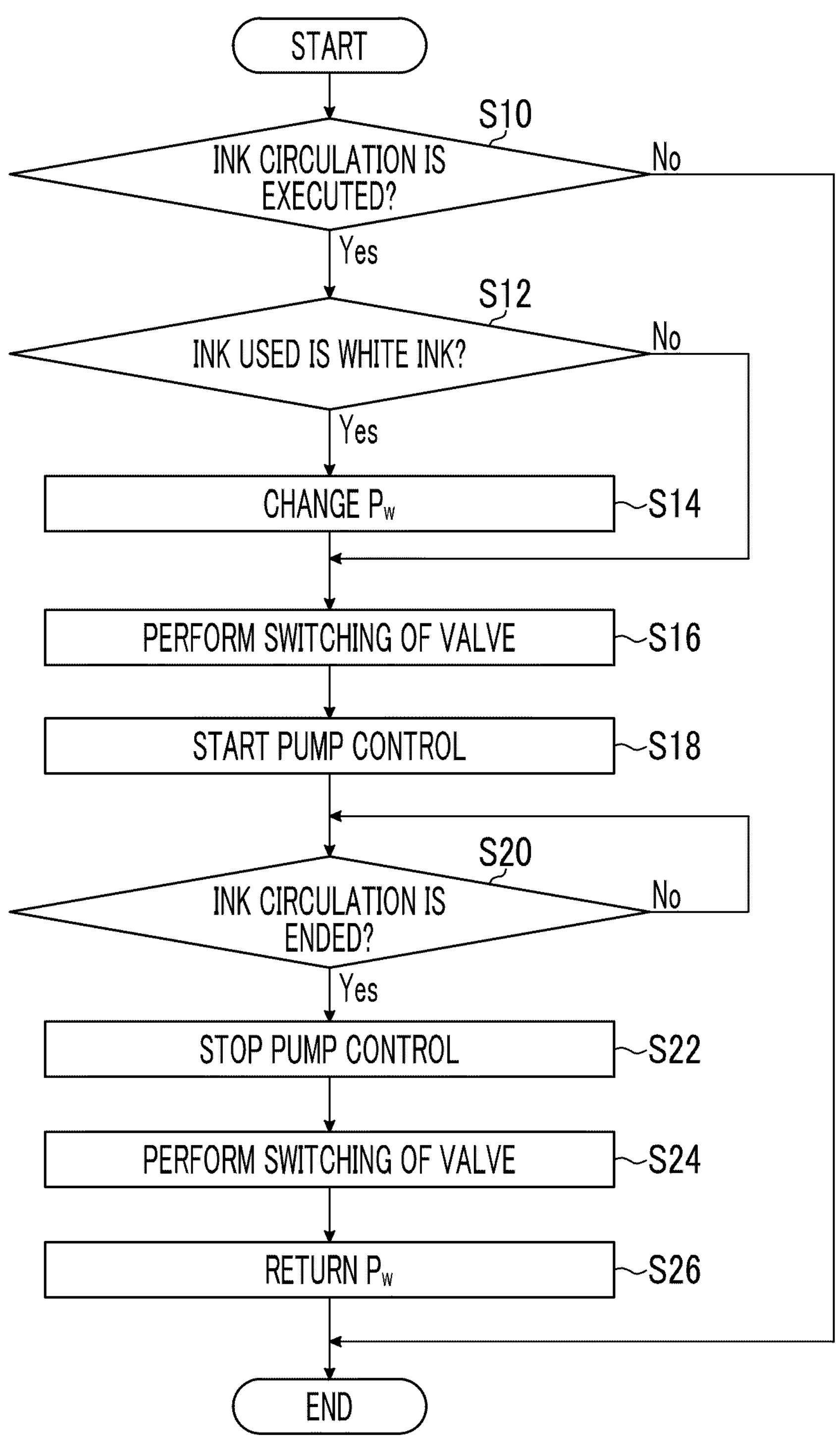
FIG. 7 is a flowchart showing a flow of a procedure of an ink circulation method according to the embodiment.

FIG. 7 is a flowchart showing a flow of a procedure of an ink circulation method according to the embodiment. A procedure of the ink circulation method shown in FIG. 7 is realized by the control device 200, to which a computer can be applied, executing various programs. The following procedure is applied to the ink supply device 10 using a white ink.

In an ink circulation execution determination step S10, the system control unit 100 shown in FIG. 2 determines whether or not to execute the ink circulation. In the ink circulation execution determination step S10, in a case in which a signal indicating the execution of the ink circulation transmitted from the printing system comprising the ink jet bar 14, which is an ink supply destination, is received, it can be determined to execute the ink circulation. In the ink circulation execution determination step S10, the printing system may be accessed for each specified period to acquire a signal indicating the execution of the ink circulation from the printing system.

In the ink circulation execution determination step S10, in a case in which it is determined not to execute the ink circulation, No determination is made. In a case of the No determination, the procedure of the ink circulation method is ended. On the other hand, in the ink circulation execution determination step S10, in a case in which it is determined to execute the ink circulation, Yes determination is made. In a case of the Yes determination, the process proceeds to an ink determination step S12.

In the ink determination step S12, the system control unit 100 determines whether or not the ink used is a white ink. In the ink determination step S12, in a case in which it is determined that the ink used is not the white ink, No determination is made. In a case of the No determination, the process proceeds to a valve switching step S16.

On the other hand, in the ink determination step S12, in a case in which it is determined that the ink used is the white ink, Yes determination is made. In a case of the Yes determination, the process proceeds to a pressure difference change step S14.

In the pressure difference change step S14, the pump control unit 102 changes the setting of the pressure difference $P_w$ to the setting of the pressure difference $P_w$ applied to the circulation of the white ink. After the pressure difference change step S14, the process proceeds to the valve switching step S16.

In the valve switching step S16, the valve control unit 104 executes switching of opening and closing of the valve 132 in accordance with the ink circulation. After the valve switching step S16, the process proceeds to a pump control start step S18.

In the pump control start step S18, the pump control unit 102 operates the pump 130 based on a pump control condition corresponding to the ink circulation to start the pump control in the ink circulation. In a case in which the pump operation control is started, the pump control unit 102 continues the operation of the pump. The ink circulation method proceeds to an ink circulation end determination step S20.

In the ink circulation end determination step S20, the system control unit 100 determines whether or not to end the ink circulation based on an end condition of the ink circulation. An example of the end condition of the ink circulation is acquisition of a command signal indicating an elapse of a specified ink circulation period and end of the ink circulation.

In the ink circulation end determination step S20, in a case in which the system control unit 100 determines to continue the ink circulation, No determination is made. In a case of the No determination, the system control unit 100 continues the ink circulation end determination step S20.

On the other hand, in the ink circulation end determination step S20, in a case in which the system control unit 100 determines to end the ink circulation, Yes determination is made. In a case of the Yes determination, the process proceeds to a pump control stop step S22.

In the pump control stop step S22, the pump control unit 102 stops the operation of the pump 130. The pump control unit 102 may stop the pump 130 after decelerating the pump 130. After the pump control stop step S22, the process proceeds to a valve switching step S24.

In the valve switching step S24, the valve control unit 104 switches opening and closing of the valve 132. In the valve switching step S24, the open/closed state of the valve 132 switched in the valve switching step S16 is returned to the original open/closed state. After the valve switching step S24, the process proceeds to a pressure difference change step S26.

In the pressure difference change step S26, the pump control unit 102 returns the setting of the pressure difference $P_w$ changed in the pressure difference change step S14 to the original set value of the pressure difference $P_w$. After the pressure difference change step S26, a specified end process is executed, and the system control unit 100 ends the procedure of the ink circulation method.

In a case in which a plurality of the ink supply devices 10 are provided, the procedure of the ink circulation method shown in FIG. 7 is applied only to the ink that requires measures against the pigment sedimentation, and a procedure of an ink circulation method for which the set pressure difference is maintained without changing may be applied to the other inks. That is, the ink circulation of the other inks can be executed in parallel with the ink circulation of the ink that requires measures against the pigment sedimentation. The ink circulation method described in the embodiment is an example of a liquid circulation method.

[Measures in Filter]

In a case in which the pressure difference applied to the ink during the ink circulation is relatively increased and the circulation speed is increased, the shear stress on the ink in the supply-side filter 26 shown in FIG. 1 is relatively increased, and soft aggregation of the ink may occur. In a case in which the soft aggregation occurs, the supply-side filter 26 is clogged, and the pressure control applied to the ink cannot be appropriately executed.

Therefore, it is preferable to increase the pressure difference during the ink circulation only in the white ink that requires measures against the pigment sedimentation compared to other color inks. Furthermore, in the supply-side filter 26, the following aspect is preferably applied for the purpose of suppressing ink clogging, ink aggregation, and the like.

The ink supply device 10 in which the white ink is used preferably has a relatively large mesh size of the supply-side filter 26 compared to the ink supply device 10 in which other color inks are used.

The ink supply device 10 in which the white ink is used preferably has a relatively large cross-sectional area of the supply-side filter 26 compared to the ink supply device 10 in which other color inks are used.

The ink supply device 10 in which the white ink is used preferably has a high replacement frequency of the supply-side filter 26 compared to the ink supply device 10 in which other color inks are used.

[Measures in Pump]

In a case in which the pressure difference applied to the ink during the ink circulation is relatively increased and the circulation speed is increased, there is a concern that the load on the pump, such as the supply pump 24 shown in FIG. 1, is increased, and the life of the pump is shortened. The following aspect is preferably applied for the purpose of suppressing shortening of the life of the pump.

During a printing period in which a print job is executed, the pressure difference during the ink circulation is made relatively high compared to other color inks, and during a non-printing period in which the print job is not executed, such as a standby time, the pressure difference in the ink circulation is made relatively low compared to the printing period. For example, during the non-printing period, the pressure difference during the ink circulation is set to be the same as that of other color inks. The print job described in the embodiment is an example of a liquid jetting job.

In the ink supply device 10 in which the white ink is used, the pump such as the supply pump 24 preferably has relatively high performance. An example in which the performance of the pump is relatively high is the performance of the pump having a margin for the maximum load. For example, the maximum output of the pump of the ink supply device 10 in which other color inks are used is 500 milliliters per minute, and the maximum output of the pump of the ink supply device 10 in which the white ink is used is 1000 milliliters per minute.

[Measures in Printing System]

As the viewpoint of measures in the printing system, it is necessary to consider cleaning of the ink jet bar 14. In the present embodiment, wiping cleaning for wiping a nozzle disposed on a nozzle surface will be described. The cleaning of the nozzle referred to here may be grasped as wiping cleaning of the nozzle opening and wiping cleaning of a nozzle surface in which the nozzle opening is disposed.

Figures 8, 9:
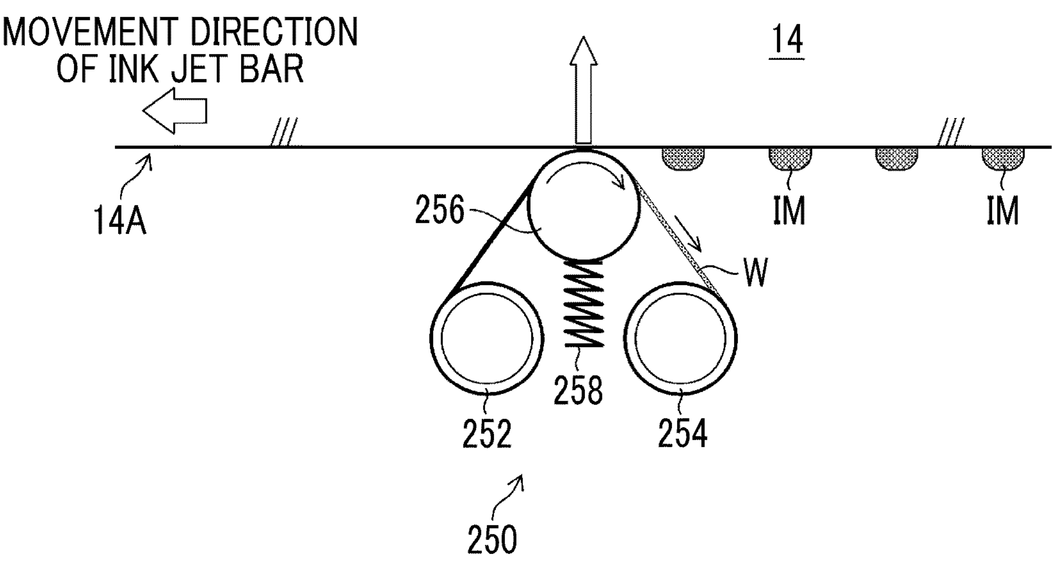
FIG. 8 is a schematic diagram showing wiping cleaning of a nozzle.
FIG. 9 is a schematic diagram showing another example of wiping cleaning of the nozzle.

FIG. 8 is a schematic diagram showing the wiping cleaning of the nozzle. In the wiping cleaning of the nozzle shown in FIG. 8, the ink jet bar 14 is moved relative to a traveling wiping web W and the wiping web W is brought into contact with a nozzle surface 14A to wipe an ink IM adhering to the nozzle surface 14A.

A wiping device 250 shown in FIG. 8 comprises a supply roll 252, a winding roll 254, a pressing roller 256, and a pressurization device 258. An unused wiping web W is wound around the supply roll 252. The used wiping web W is wound around the winding roll 254. The wiping device 250 causes the wiping web W to travel from the supply roll 252 toward the winding roll 254. A travel device that causes the wiping web W to travel is not shown.

The pressing roller 256 presses the wiping web W against the nozzle surface 14A. The pressurization device 258 applies a pressure toward the nozzle surface 14A to the pressing roller 256 to press the wiping web W against the nozzle surface 14A via the pressing roller 256. An upward arrow line shown in FIG. 8 indicates a direction of the pressure applied to the wiping web W.

FIG. 9 is a schematic diagram showing another example of the wiping cleaning of the nozzle. A wiping device 260 shown in FIG. 9 comprises a blade 262 and a blade support member 264. The wiping device 260 comprises a moving mechanism that moves the blade 262. The moving mechanism is not shown. The wiping device 260 brings the blade 262 into contact with the nozzle surface 14A to wipe the ink IM adhering to the nozzle surface 14A.

In a case of wiping cleaning in which a wiping member, such as the wiping web W shown in FIG. 8 and the blade 262 shown in FIG. 9, is brought into contact with the nozzle surface 14A, ink meniscus formed in the nozzle may be destroyed. In a case in which the ink meniscus is destroyed, a flow of the ink circulation is not stable in a case in which the circulation speed of the ink is relatively fast, and the operation of the pump that operates during the ink circulation may be unstable.

Therefore, in a case in which the white ink has a high pressure difference during the ink circulation than other color inks, it is preferable to decrease the pressure difference during the wiping cleaning compared to the pressure difference during the ink circulation. For example, as the pressure difference during the wiping cleaning, the pressure difference applied to other color inks may be applied.

The white ink described in the embodiment is an example of a first liquid. Other color inks described in the embodiment are an example of a second liquid.

[Example of Application to Program]

A program may be configured to cause a computer to realize various functions in ink circulation applied to the ink supply device 10. That is, it is possible to configure a program for causing a computer to realize a pump control function, a valve control function, a deaeration control function, a heat exchange control function, and the like.

It is possible to store a program causing a computer to realize the various functions described above, in a computer-readable information storage medium, which is a tangible non-temporary information storage medium, and to provide the program through the information storage medium.

In addition, an aspect in which a program is provided by being stored in a non-temporary information storage medium can be applied. Instead of such an aspect, an aspect in which a signal corresponding to the program is provided via a communication network can also be realized.

Effects of Embodiment

The ink supply device and the ink circulation method according to the embodiment can obtain the following effects.

[1]

In a case in which the white ink is applied, the pressure difference during the ink circulation is set to be higher than that in a case in which other color inks are applied. As a result, the sedimentation of the pigments of the white ink is suppressed, and a decrease in jetting performance of the ink jet bar 14 that jets the white ink can be avoided.

[2]

The filter such as the supply-side filter 26 provided in the ink supply device 10 in which the white ink is used preferably has a large mesh size compared to the filter provided in the ink supply device 10 in which other color inks are used. As a result, the occurrence of the soft aggregation of the white ink is suppressed, and the clogging of the white ink is suppressed.

[3]

The filter such as the supply-side filter 26 provided in the ink supply device 10 in which the white ink is used preferably has a large cross-sectional area compared to the filter provided in the ink supply device 10 in which other color inks are used. As a result, the occurrence of the soft aggregation of the white ink is suppressed, and the clogging of the white ink is suppressed.

[4]

In a case in which the print job is executed, the pressure difference during the ink circulation is relatively high. During the non-printing, the pressure difference during the ink circulation is relatively low compared to the pressure difference during the print job. As a result, it is possible to prevent the load on the pump provided in the ink supply device 10 in which the white ink is used from becoming excessively high, and to prevent the life of the pump from being shortened.

[5]

The pump such as the supply pump 24 provided in the ink supply device 10 in which the white ink is used preferably has high performance compared to the pump provided in the ink supply device 10 in which other color inks are used. As a result, it is possible to prevent the load on the pump provided in the ink supply device 10 in which the white ink is used from becoming excessively high, and to prevent the life of the pump from being shortened.

[6]

In a case in which the wiping cleaning of the nozzle is executed, the pressure difference set in the ink jet bar 14 is lowered compared to a case in which the print job is executed. As a result, even in a case in which the ink meniscus is fractured, the unstable flow of the ink circulation is suppressed, and the unstable control of the pump is suppressed.

[Configuration Example of Ink Jet Printing System]

FIG. 10 is an overall configuration diagram of the printing system according to the embodiment. An ink jet method is applied to a printing system 300 to execute single-pass printing. The printing system 300 shown in FIG. 10 comprises the ink supply device 10 described with reference to FIGS. 1 to 9.

In the printing system 300, a continuous body wound in a roll shape is applied as paper S which is a printing medium. An aspect in which a singled sheet is applied as the paper S may be used.

General-purpose printing paper may be used as the paper S. The general-purpose printing paper is not so-called ink jet-dedicated paper, but paper mainly made of cellulose, such as coated paper used for general offset printing or the like. A material other than paper, such as resin, metal, and cloth, can be applied to the paper S.

The printing system 300 comprises a conveying device 320, a delivery device 330, a pretreatment liquid coating device 340, a printing device 350, a drying device 370, and a winding device 380. Hereinafter, each device will be described in detail.

[Conveying Device]

A roll-to-roll method is applied to the conveying device 320. The conveying device 320 conveys the paper S from the delivery device 330 to the winding device 380 along a conveyance path. A conveyance direction of the paper S refers to a traveling direction of the paper S along the conveyance path of the paper S from the delivery device 330 to the winding device 380. In the following description, the conveyance direction of the paper S may be referred to as a paper conveyance direction.

The conveying device 320 comprises a plurality of pass rollers 322. The pass roller 322 functions as a guide roller that supports the paper S in the conveyance path of the paper S. Each part of the above-described printing system 300 comprises one or more pass rollers 322.

The conveying device 320 includes a conveyance member that conveys the paper S in each part of the printing system 300. Examples of the conveyance member include a printing drum 352 provided in the printing device 350. The conveying device 320 may adopt an aspect in which the delivery device 330 and the winding device 380 are provided as components.

[Delivery Device]

A feeding roll 332 is placed on the delivery device 330. The feeding roll 332 has a form in which the unprinted paper S is wound around a reel that is rotatably supported. The reel is not shown.

[Winding Device]

A winding roll 382 is placed on the winding device 380. The winding roll 382 has a form in which the printed paper S is wound around a reel that is rotatably supported. One end of the paper S is connected to the reel. A rotation shaft of a motor that rotatably drives the reel is connected to the winding roll 382. The reel and the motor are not shown.

[Pretreatment Liquid Coating Device]

The pretreatment liquid coating device 340 is disposed in a paper conveyance path and is disposed at a position on an upstream side of the printing device 350 in the paper conveyance direction. The pretreatment liquid coating device 340 applies a pretreatment liquid to a printing surface of the paper S. The pretreatment liquid is a liquid containing water and a component that aggregates or insolubilizes a coloring material component in aqueous ink to thicken the aqueous ink. The aqueous ink reacts with the pretreatment liquid and is thickened.

The pretreatment liquid coating device 340 comprises a coating roller 342, a facing roller 344, and a pretreatment liquid drying device 346. The paper S conveyed from the delivery device 330 is guided by the pass roller 322 and conveyed to a position facing the coating roller 342.

In the pretreatment liquid coating device 340, a roller coating method is applied in which the paper S is interposed between the coating roller 342 to which the pretreatment liquid is supplied and the facing roller 344, and the pretreatment liquid is applied to the printing surface of the paper S. A liquid reservoir or the like in which the pretreatment liquid supplied to the coating roller 342 is stored is not shown.

A coating method of the pretreatment liquid applied to the pretreatment liquid coating device 340 is not limited to the roller coating method. For example, a coating method other than the roller coating method, such as a blade coating method using a blade, can be applied.

The paper S coated with the pretreatment liquid is subjected to a drying treatment using the pretreatment liquid drying device 346. As the pretreatment liquid drying device 346, a method of blowing hot air from a hot air heater onto the paper S can be applied. The paper S that has been subjected to the drying treatment using the pretreatment liquid coating device 340 is conveyed to the printing device 350.

[Printing Device]

The printing device 350 prints a color image on the printing surface of the paper S. The printing device 350 comprises an ink jet bar 14K, an ink jet bar 14C, an ink jet bar 14M, an ink jet bar 14Y, and an ink jet bar 14W.

The ink jet bar 14K, the ink jet bar 14C, the ink jet bar 14M, the ink jet bar 14Y, and the ink jet bar 14W jet black ink, cyan ink, magenta ink, yellow ink, and white ink, respectively.

Each of the ink jet bar 14K, the ink jet bar 14C, the ink jet bar 14M, the ink jet bar 14Y, and the ink jet bar 14W shown in FIG. 10 corresponds to the ink jet bar 14 shown in FIG. 1.

The printing device 350 comprises an ink supply device 10K, an ink supply device 10C, an ink supply device 10M, an ink supply device 10Y, and an ink supply device 10W. Each of the ink supply device 10K and the like supplies ink of the corresponding color to each of the ink jet bar 14K and the like.

Each of the ink supply device 10K, the ink supply device 10C, the ink supply device 10M, the ink supply device 10Y, and the ink supply device 10W shown in FIG. 10 corresponds to the ink supply device 10 shown in FIG. 1.

In the following description, the ink jet bar 14K, the ink jet bar 14C, the ink jet bar 14M, the ink jet bar 14Y, and the ink jet bar 14W may be collectively referred to as the ink jet bar 14.

Similarly, the ink supply device 10K, the ink supply device 10C, the ink supply device 10M, the ink supply device 10Y, and the ink supply device 10W may be collectively referred to as the ink supply device 10.

The white ink described in the embodiment is an example of the first ink, and the black ink, the cyan ink, the magenta ink, and the yellow ink described in the embodiment are examples of the second ink.

The ink jet bar 14W described in the embodiment is an example of the first liquid jetting head, and is an example of the first ink jet head. The ink jet bar 14K, the ink jet bar 14C, the ink jet bar 14M, and the ink jet bar 14Y described in the embodiment are examples of the second liquid jetting head, and are examples of the second ink jet head.

The ink supply device 10W described in the embodiment is an example of a first liquid supply device and is an example of a first ink supply device. The ink supply device 10K, the ink supply device 10C, the ink supply device 10M, and the ink supply device 10Y described in the embodiment are examples of a second liquid supply device, and are examples of a second ink supply device.

The supply flow passage and the recovery flow passage provided in the ink supply device 10W described in the embodiment are examples of components of a first circulation flow passage. The supply flow passage and the recovery flow passage provided in the ink supply device 10K, the ink supply device 10C, the ink supply device 10M, and the ink supply device 10Y described in the embodiment are examples of components of a second circulation flow passage.

The pump 130 provided in the ink supply device 10W described in the embodiment is an example of a component of a first pressurization device. The pump 130 provided in the ink supply device 10K, the ink supply device 10C, the ink supply device 10M, and the ink supply device 10Y described in the embodiment is an example of a component of a second pressurization device.

Aqueous ink such as black or cyanide is dropped on the paper S, which is supported and conveyed using the printing drum 352, directly below the ink jet bar 14, and a color image is printed.

The aqueous ink includes an ink in which pigment particles are dispersed in a solvent such as water. In the white ink, titanium oxide is applied as a material of pigment particles capable of being sedimented in a solvent. A value more than 100 nanometers can be applied as an average particle diameter of the titanium oxide particles contained in the white ink. As the average particle diameter, a particle diameter having an integrated value of 50% in particle size distribution derived by using a laser diffraction scattering method can be applied.

The printing device 350 comprises a scanner 356. The scanner 356 comprises an imaging device that captures an image such as a test image printed on a printing surface of the paper S and generates an imaging signal corresponding to the image. As the imaging device, a color CCD linear image sensor can be applied. As the imaging device, a color CMOS linear image sensor may be applied.

The imaging device is not shown. CCD is an abbreviation for charge coupled device. CMOS is an abbreviation for complementary metal oxide semiconductor. The paper S on which the color image is printed using the printing device 350 is conveyed to the drying device 370.

[Drying Device]

In the drying device 370, hot air is blown toward the printing surface of the paper S supported by a drying drum 372 to dry the printing surface of the paper S. The paper S that has been subjected to the drying treatment on the printing surface using the drying device 370 is conveyed to the winding device 380.

[Configuration Example of Maintenance Device]

Figure 11:
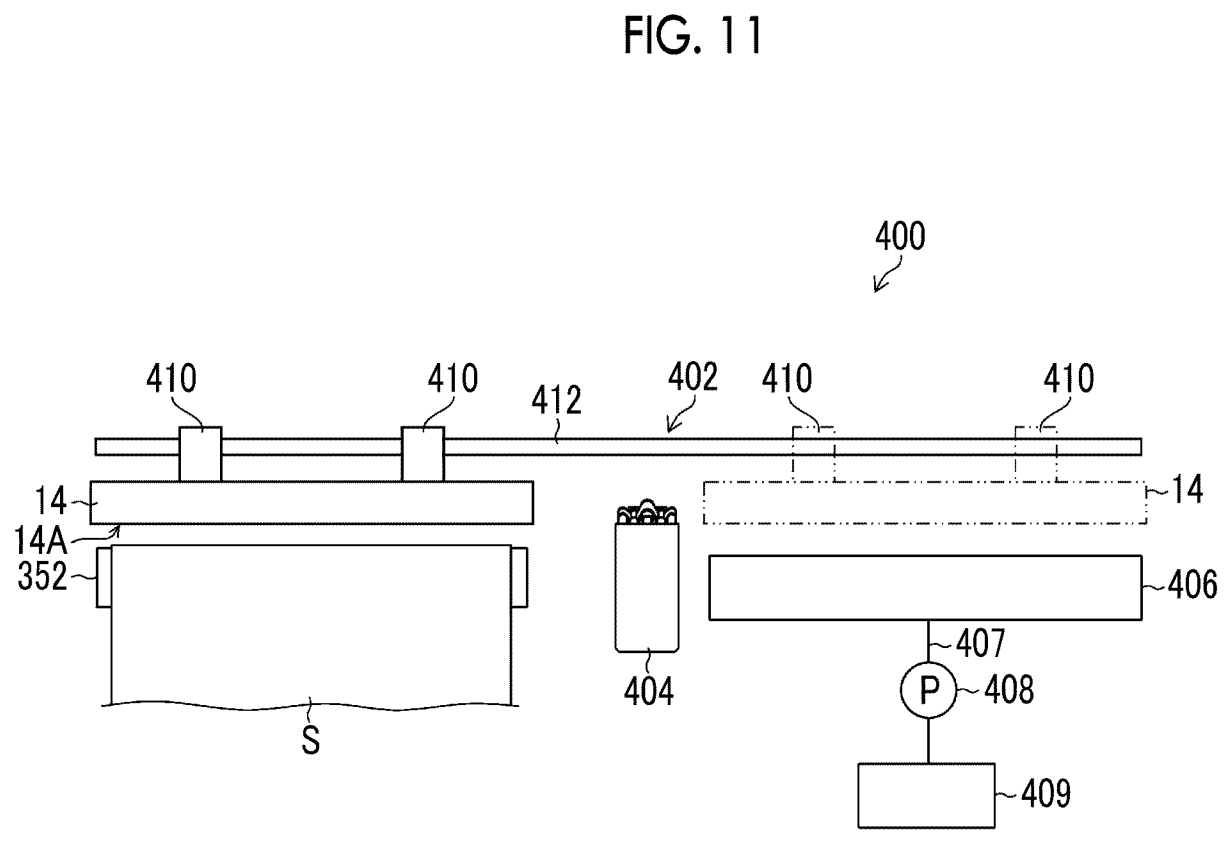

FIG. 11 is a plan view showing a configuration example of a maintenance device. A maintenance device 400 comprises a head moving device 402 that moves the ink jet bar 14. The head moving device 402 moves the ink jet bar 14 between a printing position and a maintenance position.

FIG. 11 shows a configuration comprising a carriage 410 connected to the ink jet bar 14 and a guide 412 that supports the carriage 410, as a configuration example of the head moving device 402. In FIG. 11, a linear movement mechanism connected to the carriage 410, a motor connected to the linear movement mechanism, and the like are not shown.

The printing position is a position of the ink jet bar 14 at which printing is executed on the paper S by jetting an ink from the ink jet bar 14. FIG. 11 shows the ink jet bar 14 located at the printing position by using a solid line. The maintenance position is a position of the ink jet bar 14 at which maintenance of the ink jet bar 14 is executed.

The maintenance of the ink jet bar 14 includes wiping the nozzle surface 14A to which a wiping device 404 is applied, pre-jetting to discharge the ink from the nozzle opening to a cap 406 by operating a jetting element for each nozzle, and moisturizing in which a moisturizing liquid inside the cap 406 is applied.

The cap 406 is connected to a discharge tank 409 via a discharge flow passage 407 and a discharge pump 408. The ink discharged to the cap 406 is fed to the discharge tank 409 by operating the discharge pump 408.

FIG. 11 shows the ink jet bar 14 at a maintenance execution position to which the cap 406 is applied among the maintenance positions by using a one-dot chain line. The maintenance position includes a position at which wiping of the nozzle surface 14A is executed by using the wiping device 404. As the wiping device 404 shown in FIG. 11, the wiping device 260 shown in FIG. 9 may be applied.

[Configuration Example of Ink Jet Bar]

Figure 12:
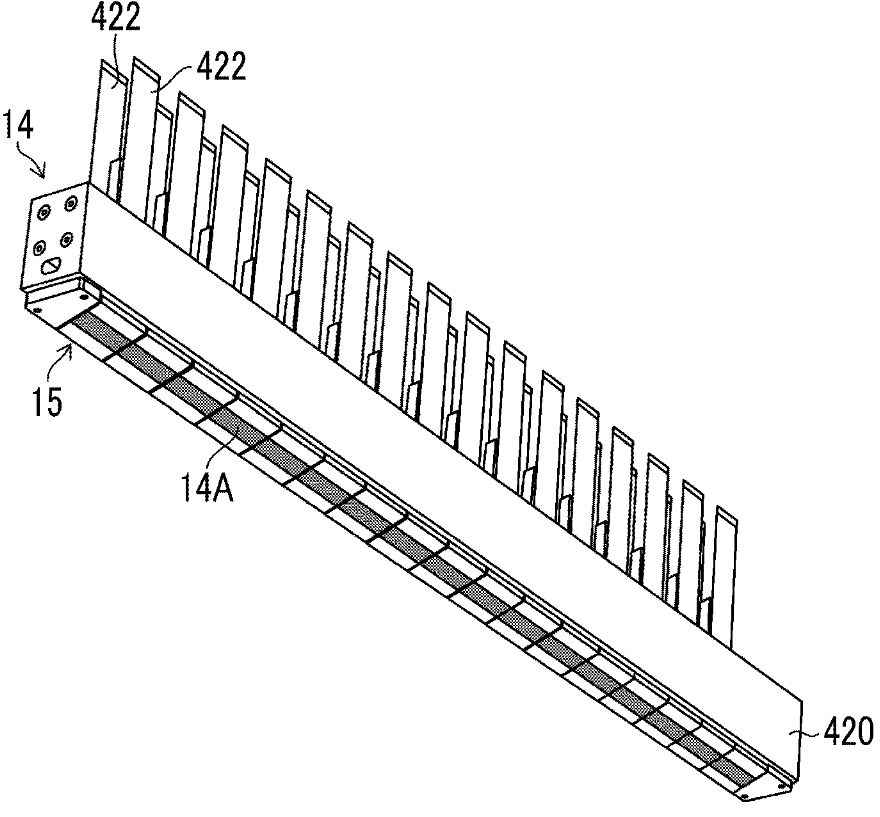
FIG. 12 is a perspective view showing a configuration example of an ink jet bar.

FIG. 12 is a perspective view showing a configuration example of the ink jet bar. In FIG. 12, the supply-side back pressure tank 30, the supply-side head manifold 32, and the like shown in FIG. 1 are not shown. The ink jet bar 14 has a structure in which a plurality of head modules 15 are connected to each other along a longitudinal direction. The plurality of head modules 15 are integrally supported by a support frame 420.

Two flexible substrates 422 are connected to each head module 15. The flexible substrate 422 is formed with an electrical wiring line for transmitting a driving voltage supplied to a jetting element provided in the head module 15.

The jetting element comprises a nozzle opening, a flow passage communicating with the nozzle opening, and an energy generation element. The energy generation element apply a jetting pressure to the ink jetted from the nozzle opening. A piezoelectric element can be applied as the energy generation element. In FIG. 12, the nozzle opening, the flow passage, and the energy generation element are not shown.

In the head module 15, a plurality of nozzle openings are formed on the nozzle surface 14A. A liquid-repellent film having liquid repellency against the ink is formed on the nozzle surface. Any arrangement such as matrix arrangement may be applied to the arrangement of the plurality of nozzle openings. The nozzle opening is shown in FIG. 14 with reference numeral "480".

Figure 13:
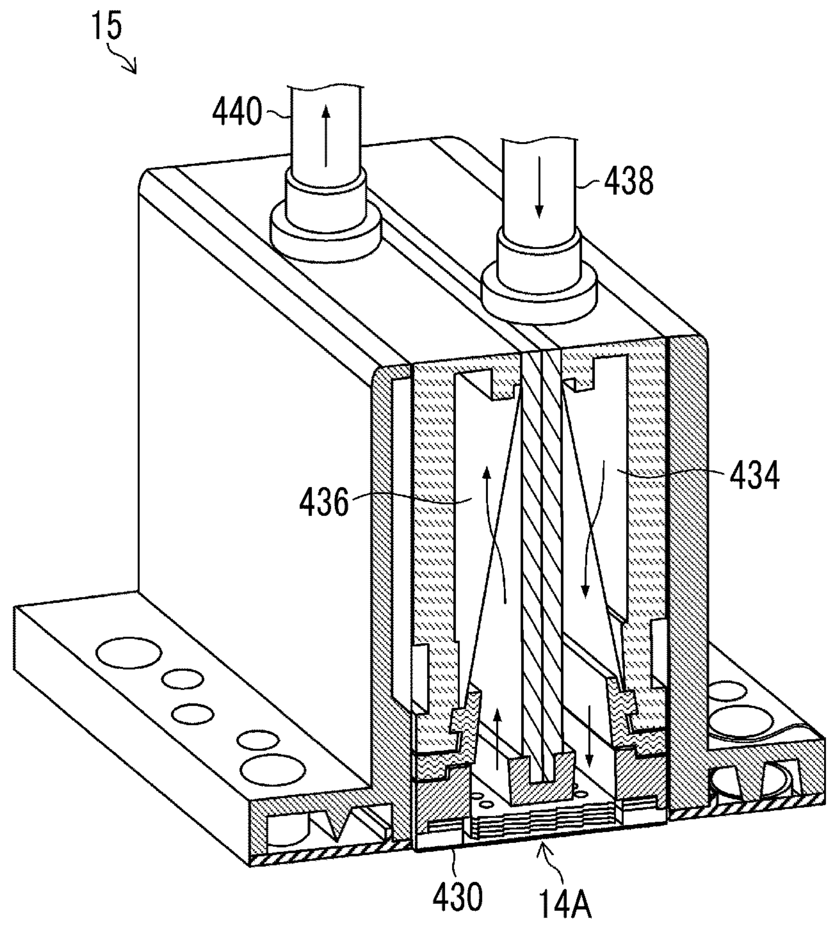
FIG. 13 is a perspective view of a head module and is a diagram including a partial cross-sectional view.

FIG. 13 is a perspective view of the head module and is a diagram including a partial cross-sectional view. The head module 15 has an ink supply unit consisting of an ink supply chamber 434, an ink circulation chamber 436, and the like on an upper surface side in FIG. 13, which is opposite to the nozzle surface 14A of a nozzle plate 430.

The ink supply chamber 434 is connected to the buffer tank 12 shown in FIG. 1 via a supply-side individual flow passage 438. The ink circulation chamber 436 is connected to the buffer tank 12 via a recovery-side individual flow passage 440.

Figure 14:
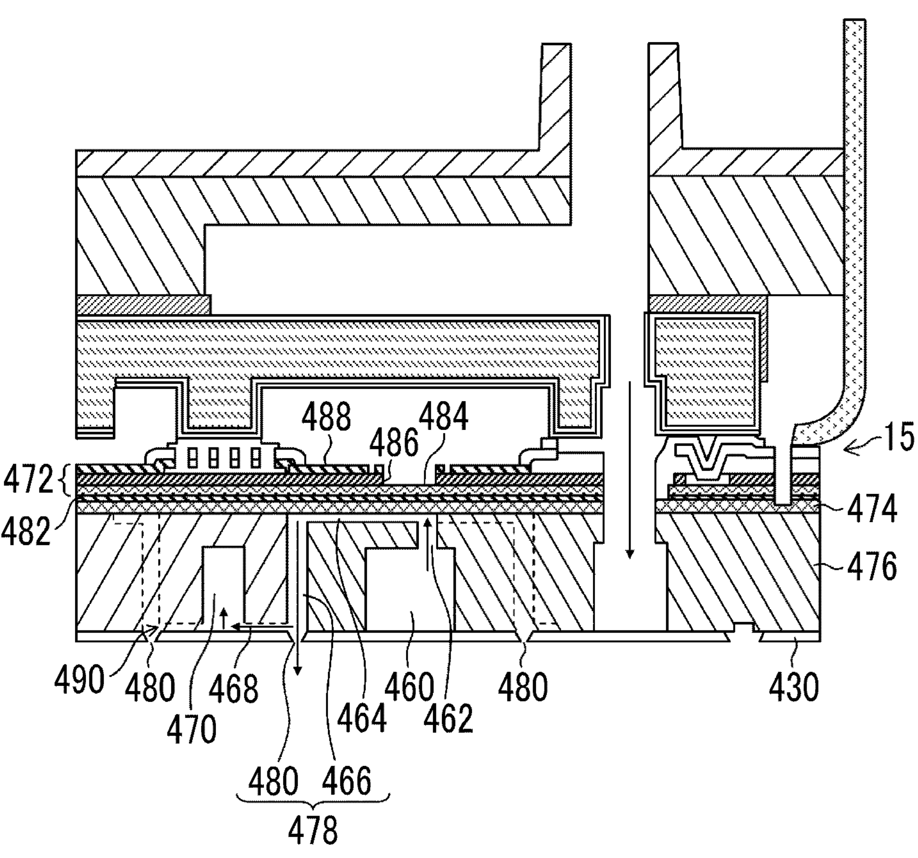
FIG. 14 is a cross-sectional view showing an internal structure of the head module.

FIG. 14 is a cross-sectional view showing an internal structure of the head module. The head module 15 comprises an ink supply path 460, an individual supply path 462, a pressure chamber 464, a nozzle communication path 466, an individual circulation flow passage 468, a common circulation flow passage 470, a piezoelectric element 472, and a vibration plate 474.

The ink supply path 460, the individual supply path 462, the pressure chamber 464, the nozzle communication path 466, the individual circulation flow passage 468, and the common circulation flow passage 470 are formed in a flow passage structure 476. A nozzle portion 478 includes a nozzle opening 480 and a nozzle communication path 466. The nozzle communication path 466 is a flow passage constituting the jetting element, and corresponds to a flow passage communicating with the nozzle opening 480.

The individual supply path 462 is a flow passage that connects the pressure chamber 464 and the ink supply path 460. The nozzle communication path 466 is a flow passage that connects the pressure chamber 464 and the nozzle opening 480. The individual circulation flow passage 468 is a flow passage that connects the nozzle communication path 466 and the common circulation flow passage 470.

The vibration plate 474 is disposed on the flow passage structure 476. The piezoelectric element 472 is disposed on the vibration plate 474 via an adhesive layer 482. The piezoelectric element 472 has a laminated structure of a lower electrode 484, a piezoelectric layer 486, and an upper electrode 488. The lower electrode 484 may be referred to as a common electrode, and the upper electrode 488 may be referred to as an individual electrode.

The upper electrode 488 is an individual electrode that is patterned according to a shape of each pressure chamber 464, and the piezoelectric element 472 is provided in each pressure chamber 464. The piezoelectric element 472 corresponds to an energy generation element constituting the jetting element.

The ink supply path 460 communicates with the ink supply chamber 434 shown in FIG. 3. The ink is supplied from the ink supply path 460 to the pressure chamber 464 via the individual supply path 462. A driving voltage is applied to the upper electrode 488 of the piezoelectric element 472 to be operated according to image data, and the piezoelectric element 472 and the vibration plate 474 are deformed to change the volume of the pressure chamber 464. The head module 15 jets ink droplets from the nozzle opening 480 via the nozzle communication path 466 in accordance with a pressure change accompanying the change in volume of the pressure chamber 464.

The pressure chamber 464 corresponding to each of the nozzle openings 480 has a planar shape of a substantially square shape, and an outlet port to the nozzle opening 480 is disposed at one of both corner portions on a diagonal line, and the individual supply path 462, which is an inlet of the ink, is disposed at the other. The shape of the pressure chamber is not limited to square. The planar shape of the pressure chamber may be various forms such as a rectangle such as a rhombus and a quadrangle, a pentagon, a hexagon or other polygons, a circle, and an ellipse.

A circulation outlet 490 is formed in the nozzle communication path 466. The nozzle communication path 466 communicates with the individual circulation flow passage 468 via the circulation outlet 490. Among the inks held in the nozzle portion 478, an ink that is not used for jetting is recovered in the common circulation flow passage 470 via the individual circulation flow passage 468.

The common circulation flow passage 470 communicates with the ink circulation chamber 436 shown in FIG. 13. The ink is recovered in the common circulation flow passage 470 via the individual circulation flow passage 468. As a result, the thickening of the ink held in the nozzle portion 478 during the non-jetting period is prevented.

FIG. 14 shows the piezoelectric element 472 having an individually separated structure corresponding to each of a plurality of the nozzle portions 478. Of course, a structure may be applied in which the piezoelectric layer 486 is integrally formed with respect to the plurality of nozzle portions 478, the individual electrodes are formed corresponding to each of the plurality of nozzle portions 478, and an active region is formed in each of the nozzle portions 478.

Two-dimensional arrangement is applied to the arrangement of the nozzle openings 480 on the nozzle surface 14A. Examples of the two-dimensional arrangement include matrix arrangement. The arrangement of the nozzle openings 480 is not limited to the matrix, and a one-row arrangement, a two-row zigzag arrangement, or the like can be applied. The arrangement of the nozzle openings 480 shown in the plan view of the nozzle surface 14A is not shown.

[Electric Configuration of Ink Jet Printing System]

FIG. 15 is a functional block diagram showing an electric configuration of the ink jet printing system shown in FIG. 10. A control system of the printing system shown in FIG. 15 may have the same hardware configuration as the control device 200 shown in FIG. 3.

The printing system 300 comprises a system control unit 500, a conveyance control unit 502, a pretreatment liquid coating control unit 504, a print control unit 506, a drying control unit 508, an ink supply control unit 510, and a maintenance control unit 512. In addition, the printing system 300 comprises a user interface 520, a storage device 522, and a sensor 524.

The system control unit 500, to which a processor is applied, transmits a command signal to the conveyance control unit 502, the pretreatment liquid coating control unit 504, the print control unit 506, the drying control unit 508, the ink supply control unit 510, and the maintenance control unit 512 to integrally control an operation of the printing system 300.

The conveyance control unit 502 controls the operations of the conveying device 320, the delivery device 330, and the winding device 380 based on predetermined conveyance conditions, and controls the conveyance of the paper S from the delivery device 330 to the winding device 380.

Examples of the conveyance conditions include a conveyance speed of the paper S, a suction pressure in a case in which the paper S is supported by suction, and a conveyance tension applied to the paper S. The term “speed” may include the meaning of speed, which is an absolute value.

That is, the conveyance control unit 502 controls the rotation of the motor connected to the conveyance member such as the printing drum 352 to control the conveyance speed of the paper S.

In addition, the operation of the pump connected to each of suction holes formed on the outer peripheral surface of the printing drum 352 and suction holes formed on an outer peripheral surface of the drying drum 372 is controlled to control the suction pressure of the paper S on the outer peripheral surface of the printing drum 352 and the suction pressure of the paper S on the outer peripheral surface of the drying drum 372.

Further, the conveyance control unit 502 controls an operation of a conveyance tension applying mechanism that applies the conveyance tension to the paper S in each device to control the conveyance tension applied to the paper S.

The pretreatment liquid coating control unit 504 applies predetermined application conditions and controls the operation of the pretreatment liquid coating device 340 to control the coating of the paper S with the pretreatment liquid. That is, the pretreatment liquid coating control unit 504 controls an application timing of the pretreatment liquid to the paper S and an application amount of the pretreatment liquid to be applied to the paper S.

The pretreatment liquid coating control unit 504 applies predetermined drying conditions and controls the operation of the pretreatment liquid drying device 346 to control the drying treatment of the paper S coated with the pretreatment liquid. That is, the pretreatment liquid coating control unit 504 performs temperature control of the drying treatment and controls an execution timing of the drying treatment.

The print control unit 506 controls the operation of the printing device 350. That is, the print control unit 506 controls jetting of the ink in the ink jet bar 14 by applying predetermined print conditions and print data. The print control unit 506 comprises an image processing unit that generates halftone data for each color from print data such as raster data.

The print control unit 506 comprises a driving voltage generation unit that generates a driving voltage to be supplied to the ink jet bar 14 based on halftone data for each color. The print control unit 506 comprises a driving voltage output unit that outputs a driving voltage supplied to the ink jet bar 14.

The print control unit 506 executes correction processing of the ink jet bar 14 based on an imaging signal corresponding to a test image or the like transmitted from the scanner 356 shown in FIG. 10. Examples of the correction processing include density correction, color correction, and correction processing for an abnormal nozzle.

The print control unit 506 comprises a maintenance control unit that controls maintenance of the ink jet bar 14. Examples of the maintenance of the ink jet bar 14 include wiping the nozzle surface 14A, purging to discharge ink from the nozzle opening 480, and moisturizing the nozzle surface 14A.

The drying control unit 508 applies predetermined drying conditions and controls the operation of the drying device 370 to control the drying treatment on the paper S on which the image is printed. That is, the drying control unit 508 controls a temperature and an air volume of hot air blown onto the paper S.

The user interface 520 is used in a case in which a user operates the printing system 300. The user interface 520 may include an input device such as a keyboard and a mouse. The user interface 520 may include a display device that displays various types of information in the printing system 300. A touch panel type display device may be applied to integrally configure the display device and the input device.

The storage device 522 stores various data, various programs, and various parameters applied to the printing system 300. A computer configured as a control device of the printing system 300 uses various data and executes various programs with reference to various parameters to realize various functions of the printing system 300.

The sensor 524 shows various sensors provided in the printing system 300. The system control unit 500 acquires a detection signal output from the sensor 524, and controls each part of the printing system 300 based on the sensor signal.

[Example of Application to Liquid Jetting System]

The printing system according to the embodiment can be applied to a liquid jetting system that forms a pattern on a substrate by using a functional liquid instead of an ink. Examples of the functional liquid include a liquid having resin particles dispersed in a solvent and a liquid having metal particles dispersed in a solvent.

Examples of the liquid having resin particles dispersed in a solvent include an insulating coating liquid such as a resist liquid. Examples of the liquid having metal particles dispersed in a solvent include a metal liquid having particles of copper, silver, gold, and the like dispersed in a solvent.

In the embodiment of the present invention described above, the configuration requirements can be changed, added, or deleted as appropriate without departing from the spirit of the present invention. The present invention is not limited to the embodiment described above, and many modifications can be made by a person having ordinary knowledge in the art within the technical idea of the present invention. In addition, the embodiment, modification example, and application example may be combined as appropriate.

EXPLANATION OF REFERENCES

10: ink supply device
10C: ink supply device
10K: ink supply device
10M: ink supply device
10W: ink supply device
10Y: ink supply device
12: buffer tank
12A: supply port
12B: recovery port
12C: bypass port
12D: overflow port
14: ink jet bar
14A: nozzle surface
14C: ink jet bar
14K: ink jet bar
14M: ink jet bar
14W: ink jet bar
14Y: ink jet bar
15: head module
15A: ink supply port
15B: ink discharge port
16: supply flow passage
18: recovery flow passage
22: deaeration module
24: supply pump
26: supply-side filter
28: heat exchanger
30: supply-side back pressure tank
30A: ink inlet
30B: ink outlet
30C: liquid chamber
30D: air chamber
30E: elastic film

30F: air bubble discharge port
30G: air flow passage communication port
32: supply-side head manifold
34: supply-side pressure sensor
35: ink supply flow passage
36: supply valve
38: supply damper
39: ink recovery flow passage
40: recovery damper
42: recovery valve
44: recovery-side head manifold
46: recovery-side pressure sensor
47: drain flow passage
48: recovery-side back pressure tank
48A: ink inlet
48B: ink outlet
48C: liquid chamber
48D: air chamber
48E: elastic film
48F: air bubble discharge port
48G: air flow passage communication port
49: drain flow passage
50: recovery pump
52: recovery flow passage valve
54: bypass flow passage
56: drain valve
58: air flow passage
59: air connect valve
60: air tank
61: atmospheric communication path
62: air valve
64: first bypass flow passage
66: second bypass flow passage
68: first bypass flow passage valve
69: second bypass flow passage valve
70: drain valve
71: air flow passage
72: air connect valve
73: air tank
74: atmospheric communication path
75: air valve
76: ink main tank
76A: main tank filter
78: replenishment flow passage
80: overflow passage
82: replenishment pump
84: first safety valve
86: second safety valve
88: third safety valve
90: recovery-side filter
92: recovery-side filter valve
100: system control unit
102: pump control unit
104: valve control unit
106: deaeration control unit
108: heat exchange control unit
110: ink determination unit
112: printing state determination unit
120: memory
122: sensor
130: pump
132: valve
200: control device
202: processor
204: computer-readable medium
206: communication interface
208: input/output interface
210: bus
214: input device
216: display device
220: pump control program
222: valve control program
224: deaeration control program
226: heat exchange control program
250: wiping device
252: supply roll
254: winding roll
256: pressing roller
258: pressurization device
260: wiping device
262: blade
264: blade support member
300: printing system
320: conveying device
322: pass roller
330: delivery device
332: roll
340: pretreatment liquid coating device
344: facing roller
346: pretreatment liquid drying device
350: printing device
352: printing drum
356: scanner
370: drying device
372: drying drum
380: winding device
382: roll
400: maintenance device
402: head moving device
404: wiping device
406: cap
407: discharge flow passage
408: discharge pump
409: discharge tank
410: carriage
420: support frame
422: flexible substrate
430: nozzle plate
434: ink supply chamber
436: ink circulation chamber
438: supply-side individual flow passage
440: recovery-side individual flow passage
460: ink supply path
462: individual supply path
464: pressure chamber
466: nozzle communication path
468: individual circulation flow passage
470: common circulation flow passage
472: piezoelectric element
474: vibration plate
476: flow passage structure
478: nozzle portion
480: nozzle opening
482: adhesive layer
484: lower electrode
486: piezoelectric layer
488: upper electrode
490: circulation outlet
500: system control unit
502: conveyance control unit
504: pretreatment liquid coating control unit
506: print control unit
508: drying control unit
510: ink supply control unit

512: maintenance control unit
520: user interface
522: storage device
524: sensor
F: joint
$F_1$: joint
$F_2$: joint
$F_3$: joint
S: paper
W: wiping web
S10 to S26: each step of ink circulation method

What is claimed is:

1. A liquid supply device that supplies a liquid to a liquid jetting head, the liquid supply device comprising:
   a circulation flow passage that communicates with a circulation port of the liquid jetting head and communicates with a supply port of the liquid jetting head;
   a pressurization device that pressurizes a liquid inside the circulation flow passage;
   an ink determination unit configured to determine whether the liquid circulated in the circulation flow passage is a first liquid or a second liquid, wherein the first liquid has particles dispersed in a solvent and has a particle sedimentation characteristic different from that of the second liquid and the particles are likely to be sedimented;
   at least one processor; and
   at least one memory that stores a command to be executed by the at least one processor,
   wherein the at least one processor is configured to
   control the pressurization device to pressurize the liquid in a case in which the liquid is circulated by using the circulation flow passage, and
   in a case in which the ink determination unit determines that the first liquid is circulated as the liquid, set a target pressure based on the determination and apply, to the first liquid, a pressure that is equal to or more than 2.0 times and equal to or less than 3.5 times a pressure to be applied to the second liquid in a case in which the second liquid is circulated.

2. The liquid supply device according to claim 1,
   wherein a filter for filtering the liquid is attached to the circulation flow passage, and
   in a case in which the first liquid is used, the filter is applied with a structure having a larger mesh size than in a case in which the second liquid is used.

3. The liquid supply device according to claim 1,
   wherein a filter for filtering the liquid is attached to the circulation flow passage, and
   in a case in which the first liquid is used, the filter is applied with a structure having a larger cross-sectional area than in a case in which the second liquid is used.

4. The liquid supply device according to claim 1,
   wherein the first liquid contains titanium oxide particles as pigment particles.

5. The liquid supply device according to claim 1,
   wherein, in a case in which the first liquid is used, the pressurization device has a relatively higher pressurization performance than in a case in which the second liquid is used.

6. The liquid supply device according to claim 1,
   wherein a diameter of the particles contained in the first liquid is larger than a diameter of particles contained in the second liquid.

7. The liquid supply device according to claim 1,
   wherein a density of the particles in the first liquid is larger than a density of particles contained in the second liquid.

8. The liquid supply device according to claim 1,
   wherein a value obtained by subtracting a density of the solvent from a density of the particles in the first liquid is larger than a value obtained by subtracting a density of a solvent from a density of particles in the second liquid.

9. A liquid jetting system using a first liquid and a second liquid, the liquid jetting system comprising:
   a first liquid jetting head that jets a first liquid which has particles dispersed in a solvent and has a particle sedimentation characteristic different from that of the second liquid and in which the particles are likely to be sedimented;
   a first liquid supply device that supplies the first liquid to the first liquid jetting head and includes a first circulation flow passage which communicates with a circulation port of the first liquid jetting head and communicates with a supply port of the first liquid jetting head a first pressurization device that pressurizes the first liquid inside the first circulation flow passage;
   a second liquid jetting head that jets the second liquid; and
   a second liquid supply device that supplies the second liquid to the second liquid jetting head and includes a second circulation flow passage which communicates with a circulation port of the second liquid jetting head and communicates with a supply port of the second liquid jetting head and a second pressurization device that pressurizes the second liquid inside the second circulation flow passage;
   an ink determination unit configured to determine whether a liquid to be circulated is the first liquid or the second liquid;
   at least one processor; and
   at least one memory that stores a command to be executed by the at least one processor,
   wherein the at least one processor is configured to
   control the first pressurization device to pressurize the first liquid in a case in which the first liquid is circulated by using the first circulation flow passage, and
   in a case in which the ink determination unit determines that the first liquid is circulated, set a target pressure based on the determination and apply, to the first liquid, a pressure that is equal to or more than 2.0 times and equal to or less than 3.5 times a pressure to be applied to the second liquid in a case in which the second liquid is circulated by using the second circulation flow passage.

10. The liquid jetting system according to claim 9,
   wherein the at least one processor is configured to, in a case in which the first liquid is circulated during execution of a liquid jetting job in which printing is executed by using the first liquid jetting head, apply, to the first liquid, a pressure that is equal to or more than 2.0 times and equal to or less than 3.5 times the pressure in a case in which the second liquid is circulated.

11. The liquid jetting system according to claim 10,
   wherein the at least one processor is configured to, in a case in which the first liquid is circulated during a standby time in which the liquid jetting job is not executed, reduce a pressure to be applied to the first liquid compared to a case in which the first liquid is circulated during the execution of the liquid jetting job.

12. The liquid jetting system according to claim 10, further comprising:

a wiping device that wipes a nozzle surface of the first liquid jetting head, wherein the at least one processor is configured to, in a case in which the first liquid is circulated in a case in which the nozzle surface of the first liquid jetting head is wiped by using the wiping device, reduce a pressure to be applied to the first liquid compared to a case in which the first liquid is circulated during the execution of the liquid jetting job.

13. A printing system that executes printing using a first ink and a second ink, the printing system comprising:

a first ink jet head that jets a first ink which has particles dispersed in a solvent and has a particle sedimentation characteristic different from that of the second ink and in which the particles are likely to be sedimented;

a first ink supply device that supplies the first ink to the first ink jet head and includes a first circulation flow passage which communicates with a circulation port of the first ink jet head and communicates with a supply port of the first ink jet head, and a first pressurization device that pressurizes the first ink inside the first circulation flow passage;

a second ink jet head that jets the second ink;

a second ink supply device that supplies the second ink to the second ink jet head and includes a second circulation flow passage which communicates with a circulation port of the second ink jet head and communicates with a supply port of the second ink jet head and a second pressurization device that pressurizes the second ink inside the second circulation flow passage;

an ink determination unit configured to determine whether an ink to be circulated is the first ink or the second ink;

at least one processor; and at least one memory that stores a command to be executed by the at least one processor, wherein the at least one processor is configured to control the first pressurization device to pressurize the first ink in a case in which the first ink is circulated by using the first circulation flow passage, and in a case in which the ink determination unit determines that the first ink is circulated, set a target pressure based on the determination and apply, to the first ink, a pressure that is equal to or more than 2.0 times and equal to or less than 3.5 times a pressure to be applied to the second ink in a case in which the second ink is circulated by using the second circulation flow passage.

14. A liquid circulation method of, via a liquid supply device that supplies a liquid to a liquid jetting head, circulating a liquid from a circulation port of the liquid jetting head to a supply port of the liquid jetting head by using a circulation flow passage that communicates with the circulation port and communicates with the supply port, the liquid circulation method comprising:

causing a computer to in a case in which the liquid is circulated by using the circulation flow passage, control a pressurization device to pressurize a liquid inside the circulation flow passage, control an ink determination unit to determine whether the liquid circulated in the circulation flow passage is a first liquid or a second liquid, wherein the first liquid has particles dispersed in a solvent and has a particle sedimentation characteristic different from that of the second liquid and the particles are likely to be sedimented, and in a case in which the ink determination unit determines that the first liquid is circulated as the liquid, set a target pressure based on the determination and apply, to the first liquid, a pressure that is equal to or more than 2.0 times and equal to or less than 3.5 times a pressure to be applied to the second liquid in a case in which the second liquid is circulated.

* * * * *